United States Patent
Krylov et al.

(10) Patent No.: US 9,551,728 B2
(45) Date of Patent: Jan. 24, 2017

(54) BISTABLE FORCE AND/OR ACCELERATION SENSOR

(75) Inventors: Viacheslav Krylov, Holon (IL); Emil Amir, Ness-Tsiyona (IL); Shila Rabanim, Bat Yam (IL)

(73) Assignee: RAMOT AT TEL AVIV UNIVERSITY LTD., Tel Aviv (IL)

( * ) Notice: Subject to any disclaimer, the term of this patent is extended or adjusted under 35 U.S.C. 154(b) by 474 days.

(21) Appl. No.: 14/117,182

(22) PCT Filed: May 9, 2012

(86) PCT No.: PCT/IL2012/050165
§ 371 (c)(1),
(2), (4) Date: Jan. 14, 2014

(87) PCT Pub. No.: WO2012/153335
PCT Pub. Date: Nov. 15, 2012

(65) Prior Publication Data
US 2014/0165724 A1 Jun. 19, 2014

Related U.S. Application Data

(60) Provisional application No. 61/483,894, filed on May 9, 2011.

(51) Int. Cl.
*G01P 15/08* (2006.01)
*G01P 15/097* (2006.01)
*G01P 15/125* (2006.01)

(52) U.S. Cl.
CPC ......... *G01P 15/0802* (2013.01); *G01P 15/097* (2013.01); *G01P 15/125* (2013.01); *G01P 2015/0857* (2013.01)

(58) Field of Classification Search
CPC ... G01P 15/097; G01P 15/125; G01P 15/0802; G01P 2015/0857
(Continued)

(56) References Cited

U.S. PATENT DOCUMENTS 5,353,641 A 10/1994 Tang
6,199,874 B1 * 3/2001 Galvin ................ B81C 1/00619
280/5.514
(Continued)

FOREIGN PATENT DOCUMENTS

EP 1975631 A2 10/2008
EP 2128565 A1 12/2009

OTHER PUBLICATIONS

B. Li et al., "Open-Loop Operating Mode of Micromachined Capacitive Accelerometer", Sensors and Actuators A, 79, pp. 219-223 (2000).
(Continued)

*Primary Examiner* — Paul West
*Assistant Examiner* — Xin Zhong
(74) *Attorney, Agent, or Firm* — Browdy and Neimark, PLLC

(57) ABSTRACT

A technique is provided for determining a force/acceleration acting on a proof mass of a bistable device. According to an aspect of the invention, the location of a boundary of one of the stable configurations of the device is monitored. The monitored location is compared to a predetermined location of the same boundary, said predetermined location corresponding to a condition in which the force/acceleration is absent, to detect a deviation of said location. The deviation is indicative of the force/acceleration and can be used to determine the force/acceleration. According to another aspect of the invention, the resonance frequency of the proof mass' oscillation in one of the stable regions is monitored, and compared to a predetermined resonance frequency the proof mass' oscillation in the same region corresponding to a condition in which the force/acceleration is absent, to determine a deviation of the resonance frequency due to the presence of force/acceleration. The deviation in the reso-
(Continued)

nance frequency can be used to determine the force/acceleration.

17 Claims, 16 Drawing Sheets

(58) Field of Classification Search
USPC .............. 73/514.15, 514.16, 514.17, 514.18, 73/514.23, 514.27, 514.29, 514.32, 73/514.38
See application file for complete search history.

(56) References Cited

U.S. PATENT DOCUMENTS

| | | | | |
|---|---|---|---|---|
| 6,327,909 | B1* | 12/2001 | Hung .................. | G01P 15/131 200/181 |
| 7,075,209 | B2* | 7/2006 | Howell ................ | B81C 99/006 200/181 |
| 7,279,761 | B2* | 10/2007 | Acar .................... | B81B 3/0056 257/415 |
| 2008/0036478 | A1* | 2/2008 | Messenger ............ | G01D 5/18 324/722 |
| 2009/0095079 | A1* | 4/2009 | Ayazi .................. | G01P 15/0975 73/514.29 |
| 2009/0255339 | A1* | 10/2009 | McNeil ................ | B81B 3/0072 73/514.15 |
| 2009/0293583 | A1* | 12/2009 | Stewart ................. | G01P 21/00 73/1.38 |

OTHER PUBLICATIONS

J. Chae, et al.,"A MonolithicThree-Axis Micro-g Micromachined Silicon Capacitive Accelerometer", J. Microelectromech. Syst., 14(2), pp. 235-242 (2005).
H.Q. Kim, et al., "Inertial-Grade Out-of-Plane and In-Plane Differential Resonant Silicon Accelerometers (DRXLs)", Proc. the 13th Int. Conf. on Solid-state Sensors, Actuators and Microsystems Transducers'05, Seoul, Korea, June, paper1B5.1 (2005).
X. Su, et al., "Single-Stage Microleverage Mechanism Optimization in a Resonant Accelerometer", Struct. Multidisc. Optim., 21, pp. 246-252 (2001).
H. Rodjegard, et al., "A Monolithic Three-Axis SOI-Accelerometer with Uniform Sensitivity", Sensors and Actuators A, 123-124, pp. 50-53 (2005).
I. Lee, et al., "Development and Analysis of the Vertical Capacitive Accelerometer", Sensors and Actuators A, 119, pp. 8-18 (2005).
S. Krylov, et al.,"Large Displacement Parallel Plate Electrostatic Actuator with Saturation Type Characteristic", Sensors and Actuators A, 130-131, pp. 497-512 (2006).
Casals-Terr'e, et al., "Snap-action Bistable Micromechanisms Actuated by Nonlinear Resonance", J Microelectromech. Syst., 17, pp. 1082-1093 (2008).
A. Michael, et al., "Design Criteria for Bi-Stable Behavior in a Buckled Multi-Layered Mems Bridge", J. Micromech. Microeng., 16, pp. 2034-2043 (2006).
J. Qui, et al., "A Curved Beam Bistable Mechanism", J. Microelectromech. Syst., 13, pp. 137-146 (2004).
J. Qui, et al. "A Bulk-Micromachined Bistable Relay with U-Shaped Thermal Actuators", J. Microelectromech. Syst,. 14, pp. 1099-1109 (2005).

P. Seunghoon, et al., "Pre-shaped Buckledbeam Actuators: Theory and Experiments", Sensors and Actuators A, 148, pp. 186-192 (2008).
M. Sulfridge, et al., "Nonlinear Dynamic Study of a Bistable MEMS: Model and Experiment", J. Microelectromech. Syst., 13, pp. 725-731 (2004).
S. Gorthi, et al., "Cantilever Beam Electrostatic Mems Actuators Beyond Pull-In", J. Micromech. Microeng., 16, pp. 1800-1810 (2006).
S. Krylov, et al., "Bouncing Mode Electrostatically Actuated Scanning Micromirror for Video Applications", Smart Mater. Struct., 14, pp. 1281-1296 (2005).
S.Krylov, et al., "Pull-In Dynamics of an Elastic Beam Actuated by Continuously Distributed Electrostatic Force", J. Vib. Acoust. 126, pp. 332-342 (2004).
J. Zhao, et al. "A Novel Threshold AccelerometerWith Postbuckling Structures for Airbag Restraint Systems", J. IEEE Sensors, 7, pp. 1102-1109 (2007).
H. Yang, et al. "A Novel Pull-in Accelerometer Based on Cantilever Beam Mass Structure", Proc. IEEE, pp. 644-647 (2005).
Younis, et al., "The Response of Clamped-Clamped Microbeams Under Mechanical Shock", Int. J. Non-Lin. Mech., 42, pp. 643-657 (2007).
Liu, et al.,"Self-Latched Micromachined Mechanism With Large Displacement Ratio", J. Microelectromech. Syst., 15(6), pp. 1576-1585 (2006).
Alsaleem, "Experimental and Theoretical Investigation of New Capacitive Switches Activated by Mechanical Shock and Acceleration", Proc. of the ASME 2007 Int. Design Eng. Tech. Conf. and Computers and Information in Engineering Conference IDETC/CIE 2007 Sep. 4-7, 2007, Las Vegas, Nevada, USA, pap. DETC2007-35417 (2007).
Elata, et al., "Analysis of a Novel Method for Measuring Residual Stress in Micro-Systems". J. Micromech. Microeng., 15(5), pp. 921927 (2005).
Mallon, et al., "Dynamic Buckling of a Shallow Arch under Shock Loading Considering the Effects of the Arch Shape", Int. J. Non-linear Mech., 41, pp. 1057-1067 (2006).
Pakula, et al., "A Pull-in Operation Mode Accelerometer", IEEE Sensors 2006, EXCO, Daegu, Korea, Oct. 22-25, 2006.
Rocha, et al., "Behavioural Analysis of the Pull-In Dynamic Transition", J. Micromech. Microeng., 14(9) pp. S37-S42 (2004).
Ya'akobovitz, et al., "Nanoscale Displacement Measurement of Electrostatically Actuated Micro-Devices using Optical Microscopy and Digital Image Correlation," Sensors and Actuators A, 162, pp. 1-7 (2010).
Ya'akobovitz, et al., "Toward Sensitivity Enhancement of MEMS Accelerometers Using Mechanical Amplification Mechanism," IEEE Sensors Journal, 10(8), pp. 1311-1319 (2010).
S. Rabanim, et al., "Bistability under tension and its use in a threshold force sensor", Micro Electro Mechanical Systems (MEMS), 2012 IEEE 25th International Conference ON, IEEE, pp. 1137-1140, Jan. 29, 2012.
S. Krylov, et al., "Dynamic stability of electrostatically actuated initially curved shallow micro beams", Continuum Mechanics and Thermodynamics; Models and Analysis of Complex Materials, Springer, Berlin, DE, vol. 22, No. 6-8, pp. 445-468, Jun. 25, 2010.
X. Li, et al: "A micromachined piezoresistive angular rate sensor with a composite beam structure", Sensors and Actuators A, Elsevier Sequoia S.A., Lausanne, CH, vol. 72, No. 3, pp. 217-223, Feb. 16, 1999.
PCT/IL2012/050165 "International Search Report" Aug. 29, 2012.

* cited by examiner

BISTABLE FORCE AND/OR ACCELERATION SENSOR

FIELD OF THE INVENTION

This invention relates to force sensors, acceleration sensors, particularly to micro-scale accelerometers.

REFERENCES

The following references are considered to pertinent for the purpose of understanding the background of the invention:

[1] Li, B., Lu, D., Wang, W., 2000. "Open-Loop Operating Mode of Micromachined Capacitive Accelerometer", Sensors and Actuators A, 79, pp. 219-223.

[2] Chae, J., Kulah, H., Najafi, K., 2005. "A MonolithicThree-Axis Micro-g Micromachined Silicon Capacitive Accelerometer", J. Microelectromech. Syst., 14(2), pp. 235-242.

[3] Kim, H. C., Seok, S., Kim, I., Choi, S., Chun, K. 2005. "Inertial-Grade Out-of-Plane and In-Plane Differential Resonant Silicon Accelerometers (DRXLs)", Proc. The 13th Int. Conf. on Solid-state Sensors, Actuators and Microsystems Transducers '05, Seoul, Korea, June, paper 1B5.1.

[4] Su, X.-P. S., Yang, H. S., 2001. "Single-Stage Microleverage Mechanism Optimization in a Resonant Accelerometer", Struct. Multidisc. Optim., 21, pp. 246-252.

[5] Rdjegrd, I H., Johansson, C., Enoksson, P., Andersson, G., 2005. "A Monolithic Three-Axis SOI-Accelerometer with Uniform Sensitivity", Sensors and Actuators A, 123-124, pp. 50-53.

[6] Lee, O., Yoon, G. H., Park, J., Seok, S., Chun, K., Lee, K., 2005. "Development and Analysis of The Vertical Capacitive Accelerometer", Sensors and Actuators A, 119, pp. 8-18.

[7] Krylov, S., Bernstein, Y., 2006. "Large Displacement Parallel Plate Electrostatic Actuator with Saturation Type Characteristic", Sensors and Actuators A, 130-131, pp. 497-512.

[8] Casals-Terr'e, Fargas-Marques, J., Shkel, A. M., 2008. "Snap-action Bistable Micromechanisms Actuated by Nonlinear Resonance", J. Microelectromech. Syst., 17, pp. 1082-1093.

[9] Michael, A., Kwok, C. Y., 2006. "Design Criteria for Bi-Stable Behavior in a Buckled Multi-Layered Mems Bridge", J. Micromech. Microeng., 16, pp. 2034-2043.

[10] Qui, J., Lang, J. H., Slocum, A. H., 2004. "A Curved Beam Bistable Mechanism", J. Microelectromech. Syst., 13, pp. 137-146.

[11] Qui, J., Lang, J. H., Slocum, A. H., Weber, A. C., 2005. "A Bulk-Micromachined Bistable Relay with U-Shaped Thermal Actuators", J. Microelectromech. Syst., 14, pp. 1099-1109.

[12] Seunghoon, P., Dooyoung, H., 2008. "Pre-shaped Buckledbeam Actuators: Theory and Experiments", Sensors and Actuators A, 148, pp. 186-192.

[13] Sulfridge, M., Saif, T., Miller, N., Meinhart, M., 2004. "Nonlinear Dynamic Study of a Bistable MEMS: Model and Experiment", J. Microelectromech. Syst., 13, pp. 725-731

[14] Gorthi, S., Mohanty, A., Chatterjee, A., 2006. "Cantilever Beam Electrostatic Mems Actuators Beyond Pull-In", J. Micromech. Microeng., 16, pp. 1800-1810.

[15] Krylov, S., Barnea, D., 2005. "Bouncing Mode Electrostatically Actuated Scanning Micromirror for Video Applications", Smart Mater. Struct., 14, pp. 1281-1296.

[16] Krylov, S., Maimon, R., 2004. "Pull-In Dynamics of an Elastic Beam Actuated by Continuously Distributed Electrostatic Force", J. Vib. Acoust. 126, pp. 332-342.

[17] Zhao, J., Jia, J., Wang, H. Li, W., 2007. "A Novel Threshold Accelerometer With Postbuckling Structures for Airbag Restraint Systems", J. IEEE Sensors, 7, pp. 1102-1109.

[18] Yang, H., Yu, Z., Li, X., Wang, Y., 2005. "A Novel Pull-in Accelerometer Based on Cantilever Beam Mass Structure", Proc. IEEE, pp. 644-647.

[19] Younis, M. I., Alsaleem, F., Jordy, D., 2007. "The Response of Clamped-Clamped Microbeams Under Mechanical Shock", Int. J. Non-Lin. Mech., 42, pp. 643-657.

[20] Liu, A.-Q., Li, J., Liu, Z., Lu, C., Zhang, X. M., and Wang, M. Y., 2006. "Self-Latched Micromachined Mechanism With Large Displacement Ratio", J. Microelectromech. Syst., 15(6), pp. 1576-1585.

[21] Tang, W. C. "Digital Capacitive Accelerometer", U.S. Pat. No. 5,353,641, Oct. 11, 1994.

[22] Alsaleem, F. M., Younis, M. I., Miles, R., Su Q., 2007. "Experimental and Theoretical Investigation of New Capacitive Switches Activated by Mechanical Shock and Acceleration", Proc. of the ASME 2007 Int. Design Eng. Tech. Conf. and Computers and Information in Engineering Conference IDETC/CIE 2007 Sep. 4-7, 2007, Las Vegas, Nev., USA, pap. DETC2007-35417.

[23] Elata, D. and Abu-Salih, S., 2005. Analysis of a Novel Method for Measuring Residual Stress in Micro-Systems". J. Micromech. Microeng., 15(5), pp. 921927.

[24] Mallon, N. J., Fey, R. H. B., Nijmeijer, H., Zhang, G. Q., 2006. Dynamic Buckling of a Shallow Arch under Shock Loading Considering the Effects of the Arch Shape", Int. J. Nonlinear Mech., 41, pp. 1057-1067.

[25] Pakula, L. French, P., 2006. "A Pull-in Operation Mode Accelerometer", IEEE Sensors 2006, EXCO, Daegu, Korea, Oct. 22-25, 2006.

[26] Rocha, L. A., Cretu, E., Wolffenbuttel, R. F., 2004. "Behavioural Analysis of the Pull-In Dynamic Transition", J. Micromech. Microeng., 14(9) pp. S37-S42.

BACKGROUND OF THE INVENTION

Inertial micro sensors, accelerometers and angular rate sensors (micro gyros) are considered as one of the most promising and intensively researched application of the MEMS (micro-electrical mechanical systems) technology. Micro scale accelerometers (along with the pressure sensors) were probably among the first micromachined electromechanical devices and first publications on the subject can be traced back to seventies. Despite such a long history of micro accelerometers and large variety of reported concepts, the development of new architectures and operational principles of high performance yet low cost, compact and manufacturable accelerometers is highly desired and continues to attract researchers in both industry and academy. Although nowadays several MEMS-based inertial sensors were successfully commercialized and incorporated into consumer electronics products (mainly cell phones and computer games consoles) and in automotive industry (air bag crash sensors), micro accelerometers have not yet penetrated the market in the area of navigation, guidance and control applications, which impose much tougher requirements to the device performance.

The operational principle of micro scale accelerometers has an electromechanical nature and is based on sensing of a mechanical displacement/motion caused by acceleration. In contrast to micro gyroscopes where alternatives to electromechanical devices are possible (ring laser gyroscope (LRG) and fiber optic gyroscope (FOG)), current accelerometers are still dominated by electromechanical sensors, mainly because no challenging alternative technology has succeeded (except for quartz resonators, which are used in the lower-grade tactical applications). MEMS based accelerometers are either of the pendulous/displacement mass type without [1] or with closed-loop force re-balance control [2] or of the resonator type [3]. The mass displacement type devices are usually micro structures incorporating a proof mass suspended on elastic bending [4, 5] deformable elements.

GENERAL DESCRIPTION

The present invention relates to a new architecture and operational principle of a bistable (micro) accelerometer (force/acceleration sensor) incorporating mechanically non-linear stiffening self-limiting suspension. Self-limiting character of the suspension manifests itself in the stiffening behavior such that the suspension is very soft at small values of the forces/deformations and becomes much stiffer at larger deformations when very large, theoretically infinite, increment of the force should be applied in order to reach small increment in the displacement. The approach is based on the monitoring of at least a boundary at least a stable region of the device. The location of the stability boundary of the device is affected by the force/acceleration, and therefore the force/acceleration can be measured by monitoring the location of these boundaries and detecting a change in these boundaries. The device of the invention is configured for measurement of force/acceleration in relatively large dynamic range (tens of g) and without contact between surfaces of the device.

According to an aspect of some embodiments of the present invention, the device is a force and/or acceleration sensor that includes a proof mass, an elastic suspension for anchoring the proof mass to a base, and an electrostatic actuator (for example an electrode or an array of electrodes), for actuating (moving) the proof mass. The elastic suspension includes at least one initially curved beam, anchoring the proof mass to the base. In a preferred embodiment, the elastic suspension includes at least two initially curved beams anchoring opposite sides of the proof mass to opposite sides of the base. In this manner, when the proof mass moves, one beam is straightened and the other beam is compressed. The structure of the sensor device causes the generation of a bistability condition, in which two regions are present in which the motions of proof mass is stable. Generally, an intermediate unstable region (in which the motion of the mass is unstable) is present between the two stable regions. When the proof mass is in such regions, the device is at a stable configuration thereof. By applying an appropriate signal to the actuator, the proof mass is moved away from the one of the stable regions, in order to reach an instability position (a boundary between the stable region and the intermediate unstable region) at predetermined times. Once the proof mass reaches the instability position, it snaps toward the second stable region by passing through the intermediate unstable region. The snapping event (also known as pull-in event) is detected, and the corresponding actuation voltage (pull-in voltage) is recorded.

The time profile of the proof mass' motion is different for a reference case in which no acceleration is present and for an actual motion case in which acceleration or force is present. Therefore, when acceleration/force is present, the actuation voltage corresponding to the snapping event differs from the actuation voltage corresponding to the snapping event without acceleration. The voltage difference is therefore indicative of the force and/or acceleration applied to the proof mass, and can be used to calculate the force and/or acceleration.

Thus, the device may be operable as a force sensor that can measure a force that is not necessarily related to acceleration. The device may be, for example, a tactile force sensor.

It is worth mentioning that the idea to measure the (inertial) forces by means of registering pull-in or snap-through event in micro devices was reported by several authors. In threshold switches and shock sensors [17-19] the switch is initiated by acceleration, which is higher than a certain threshold value, and the collapse event is registered by measuring the electric current appearing after contact. In contrast, in the device of the present invention, the contact is eliminated and the instability collapse is initiated by the actuation rather than by the inertial forces engendered by the shock. As a result, the acceleration is monitored continuously, very small accelerations can be measured, the entire acceleration-pull-in voltage curve can be built, and the variation of the acceleration with time can be monitored. A digital accelerometer based on the monitoring of the pull-in voltage of a parallel-plate electrostatic device typically includes a linear suspension spring while the contact switching is used for the interrogation [21]. Theoretical and experimental investigation of this type of device realized as a cantilever beam was presented in [22]. An approach allowing extraction of a residual stress in a double clamped micro beams and based on the measurement of the pull-in voltage was suggested in [23]. The snap-through instability in curved arches undergoing a shock loading was studied in [24]. The inventor of the present application has studied theoretically influence of the acceleration on the snap-through voltage of an initially curved bistable beam actuated by a transverse electrostatic force [Krylov, S., and Dick, N., 2010. "Dynamic Stability of Electrostatically Actuated Initially Curved Shallow Micro Beams," *Continuum Mechanics and Thermodynamics*, 22(6), pp. 445-468]. The monitoring of the switching time in a device dynamically actuated by two electrodes symmetrically located at two sides of the proof mass was investigated in [25]. Since the direction of the motion coincides or is opposite to the direction of acceleration, the measurement of the time difference of two sequential switches allows for the extraction of the acceleration. The influence of the squeeze-film damping on the pull-in dynamics in this type of devices and feasibility of the pull-in time monitoring approach in accelerometers was investigated in [26].

An aspect of the present invention relates to a device for use in sensing a force and/or acceleration, comprising a proof mass, an elastic suspension configured for anchoring said proof mass to a base, and an electrostatic actuator. The electrostatic actuator is configured for actuating said proof mass according to a selected time profile, such that a combination of forces applied to said proof mass by said elastic suspension and by said actuator generate a bistable configuration in which a first stable region and a second stable region are present where a motion of said proof mass is stable, thereby enabling determination of a deviation of a measured location of a boundary of one of the first and second stability regions with respect to a predetermined location of said boundary corresponding to a condition of no force and/or no acceleration, said deviation being indicative of the force and/or acceleration acting on the proof mass.

In a variant, an intermediate unstable region is located between said first and second stable regions, said intermediate unstable region being a region in which the proof mass moves in an unstable manner. Said boundary is a boundary between one of said stable regions and said intermediate unstable region.

Optionally, the elastic suspension is configured for limiting a movement of said proof mass such that said proof mass does not come into contact with any other element of the sensor.

In a variant, the above device comprises an additional folded suspension anchoring the proof mass to the base, and configured for limiting movement of said proof mass to a selected axis, wherein said electrostatic actuator is configured to actuate said proof mass only along said selected axis.

In another variant, the elastic suspension comprises at least a first initially curved beam, anchoring one side of said proof mass to said base, such that, upon actuation of said proof mass by said electrostatic actuator, a motion of said proof mass from an initial position thereof straightens said first beam.

In yet another variant, the elastic suspension comprises at least said first and a second initially curved beams, anchoring opposite sides of said proof mass to opposite sides of said base, such that, upon motion of said proof mass from an initial position thereof, said first beam is straightened and said second beam is compressed.

In a further variant, the above device comprises: one or more sensing utilities configured for monitoring said location of said boundary, by sensing a snapping event in which said proof mass, while being actuated by said actuator, snaps away from said first stable region toward said second stable region, and by recording a value of an actuation voltage applied to said actuator when said snapping event occurs; and a processing utility configured and operable for using data indicative of the snapping event for determining said deviation by determining a relation between the recorded actuation voltage and a reference actuation voltage corresponding to snapping in a condition of no force and/or acceleration, and using said relation for calculating the force and/or acceleration.

In yet another variant, the electrostatic actuator comprises a first parallel plate actuator comprising a first set of parallel electrodes joined to said proof mass and a second set of electrodes parallel to said electrodes of said first set, said second set of electrodes being joined to said base, such that application of potential difference between said first and second sets of electrodes produces said electrostatic force therebetween.

Optionally, the electrostatic actuator further comprises a comb drive actuator comprising a third set of parallel electrodes joined to said proof mass and a fourth set of electrodes parallel to said electrodes of said third set, said second set of electrodes being joined to said base, such that application of potential difference between said third and fourth sets of electrodes produces said electrostatic force therebetween.

In a variant, the above device comprises a thermal actuator, wherein said second electrode set is joined to said thermal actuator, said thermal actuator being controllable for varying a position of said second electrode set joined to said base, in order to change a distance between said first electrode set joined to said proof mass and said second electrode set joined to said base, thereby tuning a location of said boundary of at least one of said first and a second stability regions.

In another variant, the electrostatic actuator further comprises a second parallel plate actuator located on a side of said proof mass opposite to said first parallel set actuator for tuning a location of said first and a second stability regions, via an application of a desired constant DC voltage to said first parallel plate actuator, and an application of linearly increasing voltage to said second parallel plate actuator.

Another aspect of the present invention relates to a device for use in sensing a force and/or acceleration, comprising a proof mass, an elastic suspension, and an electrostatic actuator. The elastic suspension is configured for anchoring said proof mass to a base, and comprises at least a first initially curved beam, anchoring one side of said proof mass to said base, such that, upon actuation of said proof mass by said electrostatic actuator, a motion of said proof mass from an initial position thereof straightens said first beam. The electrostatic actuator is configured for actuating said proof mass according to a selected time profile, such that a combination of forces applied to said proof mass by said elastic suspension and by said actuator generate a bistability condition in which a first stable region and a second stable region are present where a motion of the proof mass' is stable. The electrostatic actuator is configured to causing the device to oscillate within one of the two stable regions, and excite the device at a resonant frequency thereof, such that a deviation between the device's resonant frequency and a reference resonant frequency corresponding to a condition of absence of force/acceleration is indicative of the force and/or acceleration acting on the device.

In a variant, the device's resonant frequency is the proof mass' resonant frequency.

In another variant, the device's resonant frequency is said beams' resonant frequency.

A further aspect of the present invention relates to a method for calculating a force and/or acceleration applied on a proof mass, the method comprising: attaching the proof mass to a base via an elastic suspension; actuating the proof mass via an electrostatic actuator according to a selected time profile, such that a combination of forces applied to said proof mass by said elastic suspension and by said actuator generate a bistable condition in which a first stable region and a second stable region are present where said proof mass' motion is stable; monitoring a location of a boundary of at least one of said stable regions; determining a deviation between said monitored location of said boundary with respect to a predetermined location of said boundary indicative of a condition of no force and/or acceleration; and using said deviation to determine the force and/or acceleration acting on said proof mass.

Optionally, an intermediate unstable region is located between said first and second stable regions, said intermediate unstable region being a region in which the proof mass moves in an unstable manner. Said boundary is a boundary between one of said stable regions and said intermediate unstable region.

In a variant, said monitoring comprises sensing a snapping event in which the proof mass, while being actuated by said actuator, snaps away from said first stable region toward said second stable region, and recording a value of an actuation voltage applied to said actuator when said snapping event occurs; said determining of said deviation comprises determining a relation between said recorded actuation voltage and an actuation voltage indicative of snapping in a condition of no force and/or acceleration; and said using of said deviation comprises calculating the force and/or acceleration using said relation.

In another variant, said elastic suspension comprises at least a first and a second initially curved beams, anchoring opposite sides of the proof mass to opposite sides of said base, such that, upon motion of the proof mass from an initial position thereof, said first beam is straightened and said second beam is compressed.

In a further variant, a movement of said proof mass is limited by said elastic suspension in that said proof mass does not come into contact with any element except for said elastic suspension.

An additional further aspect of the present invention relates to a method for calculating an acceleration and/or force acting on a proof mass, the method comprising: joining the proof mass to a base via an elastic suspension comprising at least one elastic beam; actuating the proof mass via an electrostatic actuator according to a selected time profile, such that a combination of forces applied to said proof mass by said elastic suspension and by said actuator generate a bistability of the device in which a first stable region and a second stable region are present, where a motion of said proof mass is stable, the actuating being performed to drive an oscillation of the proof mass within one of said stable regions, such that a resonance frequency of said proof mass or of said beam suspension is achieved; monitoring said resonance frequency; determining a deviation of said monitored resonance frequency with respect to a reference resonance frequency indicative of a condition of no acceleration and/or no force; and using said deviation to determine the acceleration and/or force acting on said proof mass.

Optionally, the actuating results in the achievement of said initially curved beam's resonance frequency, said beam being excited in the lateral direction by being pulled predominantly along said beam's axis by said proof mass and by the acceleration and/or force.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 23 is a graph illustrating change of the resonant curve of the proof mass (suspended using the curved beams) with the acceleration to which the device of the present invention is subjected to;

DETAILED DESCRIPTION OF EMBODIMENTS

Figure 1:
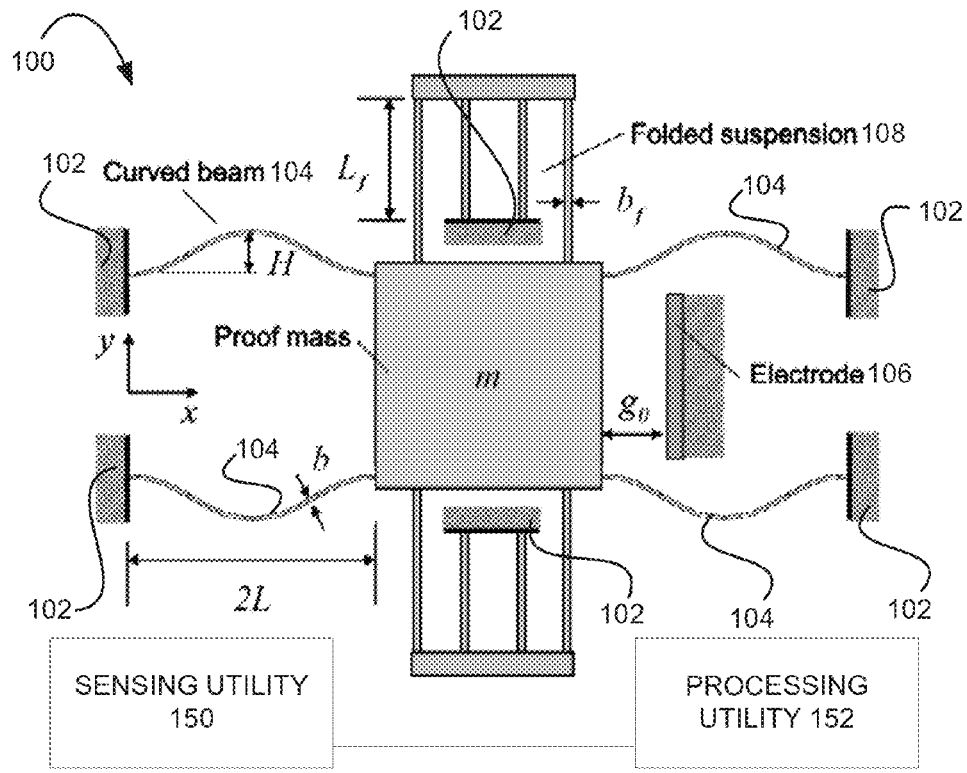
FIG. 1 is a schematic drawing of an example of the device of the present invention.

Referring now to FIG. 1, a schematic illustration exemplifies device 100 of the present invention. The device 100 includes a proof mass m attached/anchored to a base 102 (such as a substrate) by an elastic suspension, and actuated by an electrostatic force. The electrostatic force is implemented using an electrostatic actuator for moving the proof mass according to a selected time profile, such that a combination of forces applied to the proof mass by the elastic suspension and by the actuator generate a bistable condition in which a first region and a second region are present where a motion the proof mass is stable. Between these stable regions, an instability region is present, in which the motion of the proof mass is unstable. By monitoring a location of a stability boundary of at least one of the stable regions (generally the boundary between one of the stable regions and the unstable region) and determining a deviation thereof with respect to a predetermined location of the stability boundary indicative of a condition of no force and/or acceleration, the force and/or acceleration acting on the proof mass can be determined. The stability boundary can be monitored using one or more appropriate sensing utilities 150 (e.g. of the kind sensing a change in the position of the proof mass from the $1^{st}$ stability region to the $2^{nd}$ stability region through the instability region (snapping event), in response to applied electric field, e.g. voltage supply to an electrode (actuation voltage)). As an example, the snapping event can be detected by monitoring the capacitance between the movable electrodes attached to the proof mass and the fixed electrodes attached to the substrate. The snapping event is registered when the capacitance is higher than a certain threshold value, indicating that the pull-in event took place. Alternatively, since the snapping is a dynamic phenomenon and the velocity of the proof mass increases significantly during the snap, the current in the capacitor circuit, which is proportional to the time derivative of the capacitance and therefore time derivative of the displacement (the velocity) can be registered to detect the snapping event. Optical detection of the snapping event can be used as well.

The determination of the deviation of the monitored stability boundary can be performed using appropriate processing utility 152 preprogrammed to be responsive to the sensed data and to calculate the force and/or acceleration acting on the proof mass using a recorded actuation voltage value corresponding to the snapping of the proof mass and comparing the recorded actuation voltage value with a reference actuation voltage value corresponding to the snapping event in a condition in which no force and/or acceleration is present.

The elastic suspension is a mechanically nonlinear stiffening suspension incorporating at least one (but preferably four) initially-curved flexible beam 104 arranged in such a way that the beam(s) is (are) loaded predominantly along its (their) axis. The length of each of the beams is 2L, width b, height h and initial elevation H. The mass m is actuated by an electrostatic force directed along the x-axis (parallel to the main axis of the beams), the electrostatic force being provided by a parallel-plate electrode or a comb-drive transducer (not shown). The parallel plate electrode includes one or more fixed electrodes 106 and one or more moving electrodes that are either joined to mass m or incorporated within the mass m. The actuation voltage is applied to the parallel plate electrode, in order to charge the fixed electrode(s) and moving electrode(s), so as to cause an electrostatic force to act between the fixed electrode(s) and the moving electrode(s). If a comb drive transducer (actuator) is used, the comb drive actuator includes a fixed set of electrodes joined (anchored) to the base and a moving set of electrodes joined to the proof mass. Photographs of exemplary parallel plate and comb actuators can be found in FIG. 8. The charging of the comb drive transducer via an actuating voltage is similar to the charging of the parallel plate electrode.

The initial distance between the fixed and moving electrode(s) of the parallel-plate transducer is $g_0$. In order to enforce the displacement of the mass in the x direction and reduce the compliance in the y direction, an additional folded suspension 108 is provided to anchor the proof mass to the base. The length and width of the beams of the folded suspension are $L_f$ and $b_f$, respectively.

When two or more beams are present and joined to opposing sides of the proof mass, application of the actuating force in the x direction results in the decrease in the curvature (straightening) of one (hereafter referred as the "left") beam or pair of the curved beams and increase in the curvature of the other ("right") beam or pair of the beams. Straightening of the beams is accompanied by a significant increase of the suspension's stiffness in the x direction, whereas the contribution of the compressed pair of the beams to the stiffness is of a weakening type and is relatively minor. Note that the stiffness of the folded suspension in the x direction is assumed to be displacement-independent and is much lower than the stiffness of the straightened curved beams. Since a curved beam loaded by a force directed along a line connecting the beam's ends cannot be completely straightened by a finite force, the force-displacement characteristic (i.e., the dependence between the force applied to the beam's end and the displacement of the end of the bean in the x direction) of such a beam is of a self-limiting type and it can be considered in a sense as a compliant one-directional constraint. Due to the symmetry of the beam's arrangement, the entire suspension serves as a two-directional constraint.

In the case of the actuation by a parallel-plate electrode, the presence of nonlinear softening type electrostatic force acting on the proof mass may result in a pull-in instability. However, in contrast to the devices with linear suspensions, the pull-in collapse is accompanied by the straightening of the curved beams, steep increase of the suspension stiffness, and appearance of an additional stable configuration, as was shown in [7].

Generally, bistable micro structures can be subdivided into two groups—"mechanically bistable" structures and "electrostatically bistable" structures. Mechanically bistable devices utilize snap-through buckling of initially curved, S-shaped or chevron-shaped, or pre-stressed beams loaded in the direction perpendicular to the beam's axis [8-13]. In contrast, electrostatic bistability is related to the nonlinear dependence of the electrostatic force on the deflections (motion) of the proof mass, combined with the contact-type nonlinearity. Specifically, when the actuating voltage exceeds the pull-in value, the structure collapses toward the actuating electrode. A mechanical constraint (stopper) limiting the displacement prevents the contact and the electrical short with the electrode, the system becomes effectively stiffer after the contact between the movable electrode and the typically insulating mechanical constraint, and an additional stable equilibrium may exist beyond the pull-in point [14-16].

In the device of the present invention the contact with the mechanical constraint (stopper) is replaced by a compliant constraint. The device of the present invention therefore eliminates contact, which is often undesirable from the reliability point of view. From this prospective the device of the present invention is more similar to the "electrostatically" bistable device, since the bistability appears solely as a result of the interplay between the mechanical and electrostatic forces when each of these forces is a monotonous function of displacement. In the case of compliant constraints, further increase of the actuating voltage may result in an additional secondary pull-in instability associated with the extensibility of the beam's axis or presence of additional compliances in the structure.

As an embodiment of the present invention, the bistable device is used as a threshold accelerometer. In another embodiment of the present invention, the device is used as a force sensor when the force is not necessarily related to acceleration. Such an embodiment may be applied, for example to a tactile device.

In a non-limiting example of the framework of the device's operation scenario, the actuating voltage is linearly increased and decreased quasistatically, at the frequency much lower than the device's fundamental frequency (at the frequency comparable with the required bandwidth of the sensor) and in such a way that the magnitude of a triangular or saw tooth voltage signal is higher than the pull-in voltage. The actuation frequency is mainly dictated by the required bandwidth of the sensor. At every cycle of the triangular or saw tooth voltage signal, the pull-in snap between the two stable configurations takes place and the value of the pull-in voltage is registered. When the device is located in a non-inertial coordinate system, the presence of an additional inertial force affects the critical value of the voltage. The acceleration is measured by monitoring of the value of the pull-in voltage. The detection of the proof mass snapping event is realized using a displacement threshold approach. Namely, the pull-in event is considered to take place when the displacement of the proof mass becomes larger than a certain prescribed value (which is larger than the pull-in deflection value) hereafter refereed as the displacement threshold. Any of the existing sensing approaches, e.g., capacitive or optical, can be implemented for the detection of the pull-in (snapping) event.

The inventors have demonstrated, using a model, that bistability is achievable in the electrostatically actuated device with a self-limiting suspension. This conclusion is supported by preliminary experimental results, which are consistent with the model predictions. In addition, it will be shown that improved performance of acceleration sensing can be achieved in the bistable device.

Figure 2:
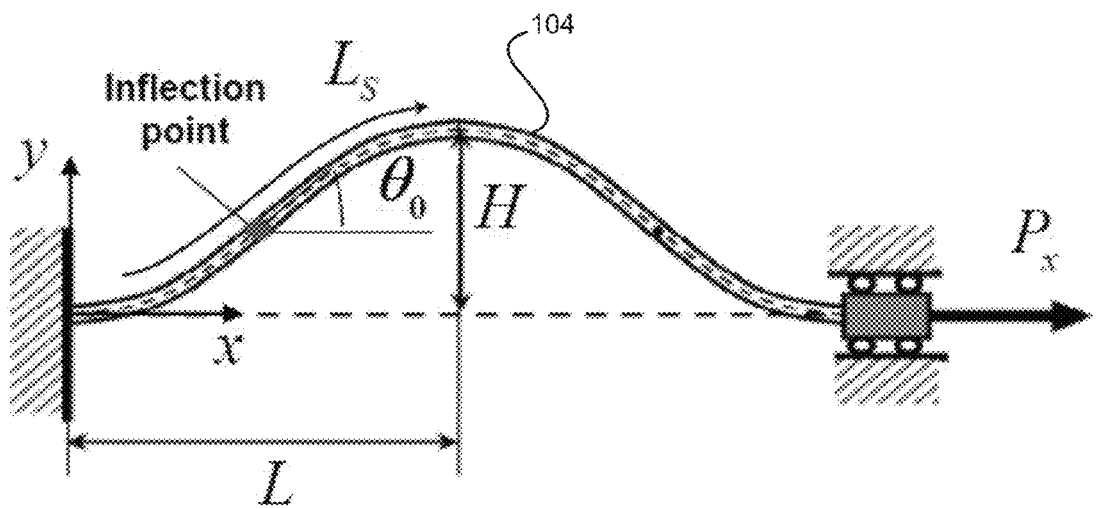
FIG. 2 is a schematic drawing of a model of the curved beam.

Referring now to FIG. 2, there is illustrated a model of a curved flexible beam 104. Each of the curved suspension elements of FIG. 1 was modeled as an initially curved beam 104 loaded by a force $P_x$ applied along the x-axis. The elevation of the beam in its initial configuration is H. The model of the half of the beam considered in the framework of the Euler-Bernoulli theory was presented in details in [7]. Large deflection extensible elastica and reduced order models of the beam were built and the comparison showed good agreement between the two. For the sake of consistency, we adopt the initial length and the arc length of the curved beam to be equal to 2L and $2_S$, respectively.

The initial shape of the beam is assumed to be such that the angle $\Theta$ made by the tangent to the undeformed beam axis with the x-direction is given by the expression (see [7])

$$\Theta = \Theta_0 4\hat{S}(\hat{L}_S - \hat{S}) \qquad (1)$$

Here $\hat{S}=S/L$ is the non-dimensional arc length (material) coordinate, $\hat{L}_S=L_S/L$ and $\Theta\hat{L}_S^2$ is the slope at the inflection point. Hereafter hats denote non-dimensional quantities. The approximation for the initial length of the curved beam and the slope at the inflection point are $$2\hat{L}_S \approx 1 + \sqrt{1 + \frac{12\hat{H}^2}{5}} \quad \Theta_0 \hat{L}_S^2 \approx \frac{3\hat{H}}{5\hat{L}_S} \qquad (2)$$

The value $\hat{\Delta}=2\hat{L}_S-2$ is actually the maximal displacement of the end point of the beam, which can be achieved if the beam's axis, considered to be inextensible, is completely straightened.

In accordance with the half beam model of the Euler-Bernoulli theory [7], we approximate the deformed shape of the beam by the same function which defines the initial shape of the beam, namely $$\theta = \theta_0 4\hat{S}(\hat{L}_S - \hat{S}) \qquad (3)$$

where $\theta_0 \hat{L}_S^2$ is now the slope at the inflection point of the deformed beam. Using the Rayleigh-Ritz method combined with the assumption $\Theta \ll 1$, $\theta_0 \ll 1$, the values of the normalized end point displacements of the beam can be obtained $$\hat{\Delta}_x \approx 2(\hat{L}_s - 1) + 2\hat{L}_s \pi^2 \hat{r}^2 \hat{P}_x - \frac{8}{15}\hat{L}_s^5(1 + 2\pi^2 \hat{r}^2 \hat{P}_x)\theta_0^2 \qquad (4)$$

$$\hat{\Delta}_y \approx \hat{H} - \frac{2}{3}\hat{L}_s^3(1 + \pi^2 \hat{r}^2 \hat{P}_x)\theta_0 \qquad (5)$$

where $$\theta_0 \approx \frac{\Theta_0}{1 + \hat{L}_s^2(\pi^2/10)\hat{P}_x(1 + \pi^2 \hat{r}^2 \hat{P}_x)} \qquad (6)$$

and $\hat{\Delta}_x = \Delta_x/L$, $\hat{\Delta}_y = \Delta_y/L$.

In addition, $\hat{P}_x = P_x L^2/(\pi^2 EI)$ is the ratio between the axial force and the Euler buckling force of a simple supported beam of the length L and the bending stiffness EI;

$$\hat{r} = \sqrt{I/(AL^2)}$$

is the normalized gyration radius of the beam's cross section.

It should be noted that in order to be able to operate the device using reasonably low actuation voltages the typical suspension elements used in this work are realized as very slender beams. Taking into account that for slender beams $\hat{r} \ll 1$ and using eq. (2), we write eq. (4) in the form $$(\hat{\Delta})_x \sim 2(\hat{L}_s - 1)\left(1 - \frac{1}{\left(1 + \hat{L}_s^2(\pi^2/10)\hat{P}_x\right)^2}\right) + 2\hat{L}_s \pi^2 \hat{r}^2 \hat{P}_x \qquad (7)$$

The second term in eq. (7) is the elongation of a straight rod under axial tension by the force while the first term corresponds to the model of a curved beam with an inextensible axis. For small axial forces $P_x \ll 1$ the second term is negligible and the deformation of the beam is predominantly due to the bending. Under large applied axial force $\hat{P}_x \gg 1$ when the beam is almost completely straightened the contribution of the first term to the elongation is constant and equal to $2(\hat{L}_s-1)$. At this stage the displacement of the end of the beam is predominantly due to extensibility of its axis (the second term in eq. (7)). We can conclude therefore that the beam can be viewed approximately as a serial connection of a curved beam with an inextensible axis and a straight extensible beam.

Figure 3:
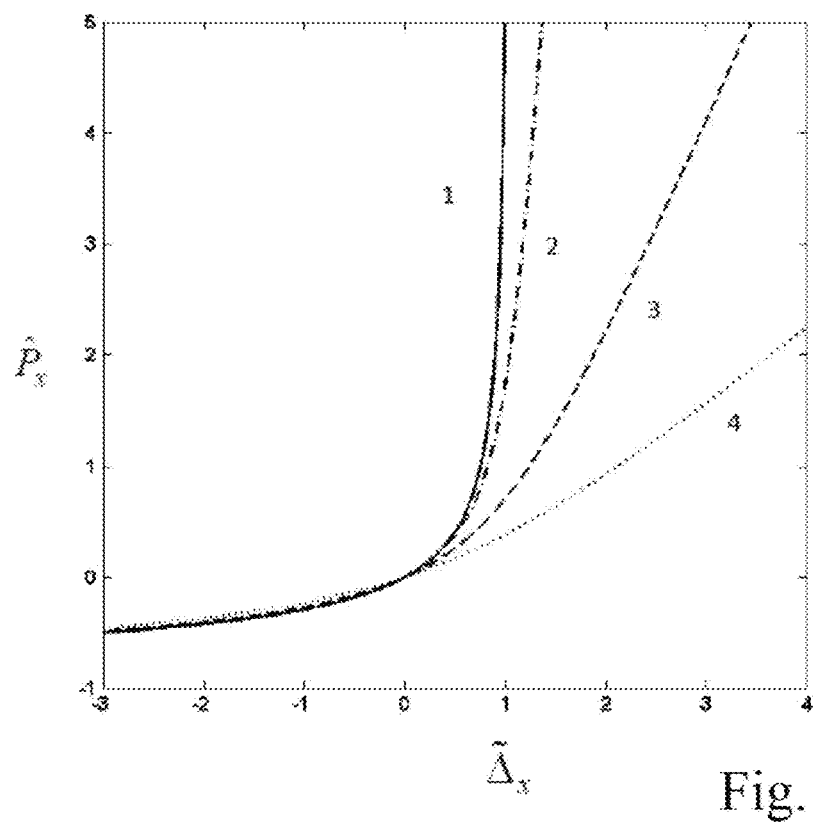
FIG. 3 is a graph illustrating a calculated dependence of the normalized axial end force on the normalized axial displacement for differing initial elevation and gyration radius of the beam's cross-section.

The axial displacement $\hat{\Delta}_x = \Delta_x/(2(L_s-L))$ of the end point of the beam normalized by the value corresponding to the completely straightened inextensible beam is shown in FIG. 3 for differing values of initial elevation and gyration radius and for the half length of the beam of L=500 μm. The non-dimensional value of the gyration radius of $\hat{r}=1.17\times10^{-3}$ corresponds to the cross section of 3×30 μm² while the value of $\hat{r}=2.90\times10^{-3}$ corresponds to the 5×30 μm² cross section of the beam. One observes that the deformation of the curved beam subjected to an end force can be subdivided into two stages. In the first stage, the "straightening" or "bending" stage, the beam is straightened from a curved to straight configuration and in the second stage, the "extensible" stage, the beam mainly elongates as a straight rod under axial tension. Since the stiffness of the beam at the first stage is significantly lower than at the second stage, the force-displacement dependence of this kind of suspension is of a self-limiting type and the beam can be viewed, in a sense, as a one-directional constraint. The nonlinearity of the beam under axial tension force is of a stiffening type. In contrast, the nonlinearity under compression force is of a softening type. Comparison between the results provided by the reduced order model of the beam and the exact extensible elastica solution was carried out [7] and excellent agreement between the two was observed.

Note that in the case when the extensibility of the beam's axis can be neglected, the axial displacements of the end point of the beam $\Delta_x$ and the transversal deflection $\Delta_y$ of the midpoint are related by algebraic relation obtained from eqs. (4) and (5) by setting $\hat{r}=0$.

$$\hat{\Delta}_x = 2(\hat{L}_S - 1) - \frac{6(\hat{H} - \hat{\Delta}_y)^2}{5\hat{L}_s} \quad (8)$$

In order to evaluate the range of the device's design parameters, investigate its performance as well as to provide better insight into its behavior, a lumped model of the device shown in FIG. 1 was built. The device was modeled as an assembly of a rigid proof mass and flexible suspension elements considered as massless beams. In addition, it was assumed that the rotation of the proof mass around the z-axis is precluded and the device can be viewed as a statically undeterminate nonlinear one-degree-of-freedom (DOF) system. Dimensional equilibrium and compatibility equations of the assembly have the form $$K_f u + 2P_x^{(L)} - 2P_x^{(R)} = ma + \frac{\varepsilon_0 A_e V^2}{2(g_0 - u)^2} \quad (9)$$

$$\Delta_x^{(L)} = -\Delta_x^{(R)} = u \quad (10)$$

Here $K_f = 24EI_f/(L_f^3)$ is the stiffness of the folded suspension and $P_x^{(L)}$ and $P_x^{(R)}$ are the forces applied to the proof mass by each of the left and right curved beams, respectively. Positive directions of $\Delta_x^{(L)}$ and $\Delta_x^{(R)}$ correspond to the elongation of the left and the right curved beams, respectively; positive directions of the end forces $P_x^{(L)}$ and $P_x^{(R)}$ are chosen to be consistent with notations of FIG. 2 and correspond to the tension of the beams. Consequently, the displacement of the proof mass, $u=\Delta_x^{(L)}$, and the acceleration, a, are considered to be positive in the positive x-direction. In addition, in accordance with eq. (9), the electrostatic force is calculated using the simplest parallel-capacitor formula where $\varepsilon=8.854\times10^{-12}$ F/m is permittivity of the free space, $A_e$ is the total area of the electrode, $g_0$ is the initial electrostatic gap and V is the actuation voltage.

The system (9), (10) competed by the force-displacement (constitutive) relation, eq. (4) was solved using the following procedure. First, the force $P_x^{(L)}$ was prescribed and the displacement $\Delta_x^{(L)}=u$ was found using the dimensional counterpart of eq. (4). Next, the force $K_f u$ provided by the folded suspension was calculated. The compatibility condition (10) was then used to calculate numerically the force $P_x^{(R)}$. Finally, the actuation voltage was evaluated using the equilibrium equation (9).

Figure 4:
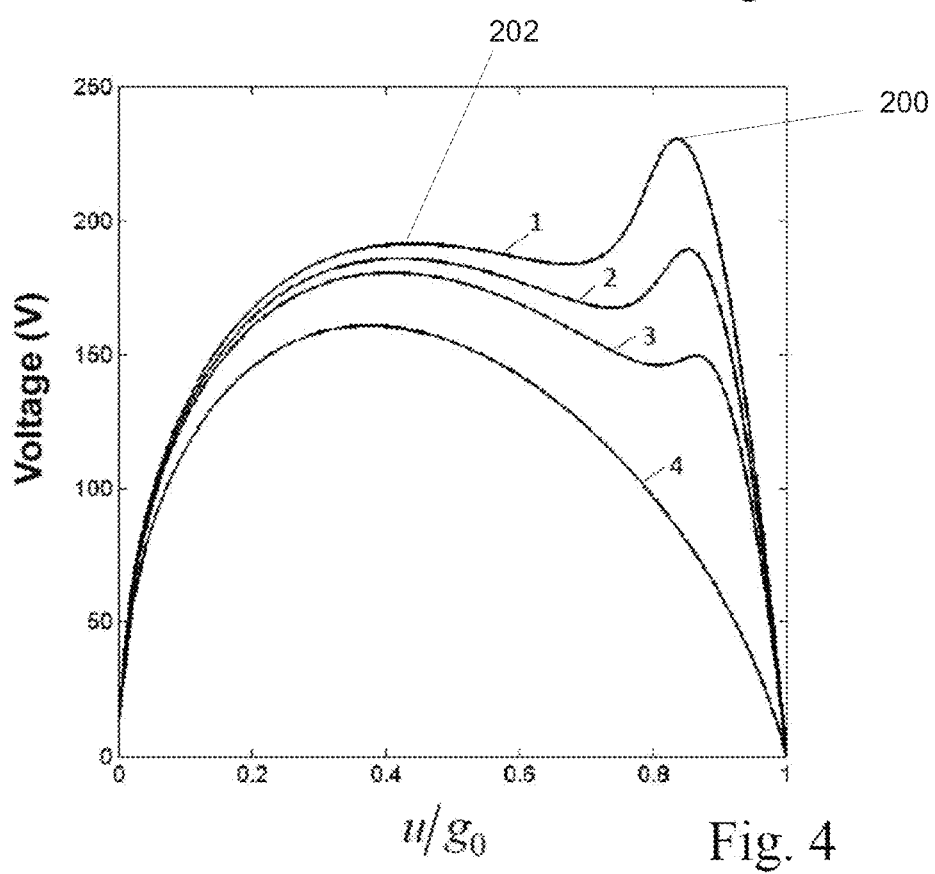
FIG. 4 is a graph illustrating calculated equilibrium curves (displacement-voltage dependence) of the device of the invention for differing initial elevations of the curved suspension beams and for zero acceleration.

The calculations were carried out for the device containing 1000×1000×30 μm³ proof mass, 1000×3×30 μm³ folded suspension beams, 1000×3×30 μm³ curved beams. In addition, the length of the electrode was 1000 μm. The influence of the initial elevation is illustrated in FIG. 4, which illustrates different curves for different values of initial elevation, for the case when the initial distance between the electrodes is preserved. Note that in this case, the change in the initial elevation of the beam results also in the change of the relative distance between the electrodes $\eta=g_0/\Delta_x^{MAX}$ since for larger H the maximally achievable elongation $\Delta_x^{MAX}=g_0/(2(L_S-L))$ of the beam is larger and $\eta$ is smaller. One observes that for appropriate values of parameters the pull-in collapse taking place at the "bending" stage of the beam's deformation is followed by the steep increase of the suspension stiffness and appearance of an additional stable equilibrium of the device. Further increase of the voltage results in a secondary pull-in collapse toward the electrodes. The decrease of the voltage results in the release at the voltage lower than the pull-in values. FIG. 4 suggests that in the case when the secondary pull-in voltage (the rightmost peak, e.g. peak 200) is higher than the primary pull-in value (leftmost peak, e.g. peak 202), the device is bistable within the interval of the voltages between the primary pull-in and release values. If the secondary pull-in voltage is lower than the primary one (e.g. in curve 3), the upper bistability boundary is limited by the secondary pull-in voltage. Note that in this case, the second stable equilibrium cannot be reached using quasistatic loading but can be reached dynamically [Krylov, S., and Dick, N., 2010. "Dynamic Stability of Electrostatically Actuated Initially Curved Shallow Micro Beams," *Continuum Mechanics and Thermodynamics*, 22(6), pp. 445-468]. FIG. 4 indicates also that η has very strong influence on the device behavior. For small η the stiffening of the suspension after the pull-in collapse is not sufficient and no second stable configuration is possible (see curve 4). For larger η the device becomes bistable while the further increase of η reduces the bistability range in terms of voltages (curves 1-3). For even larger η (it is to say, larger $g_0$ or, alternatively, smaller H) the bistablity disappears and the voltage-displacement dependence is monotonous up to the pull-in instability (not shown).

Figure 5:
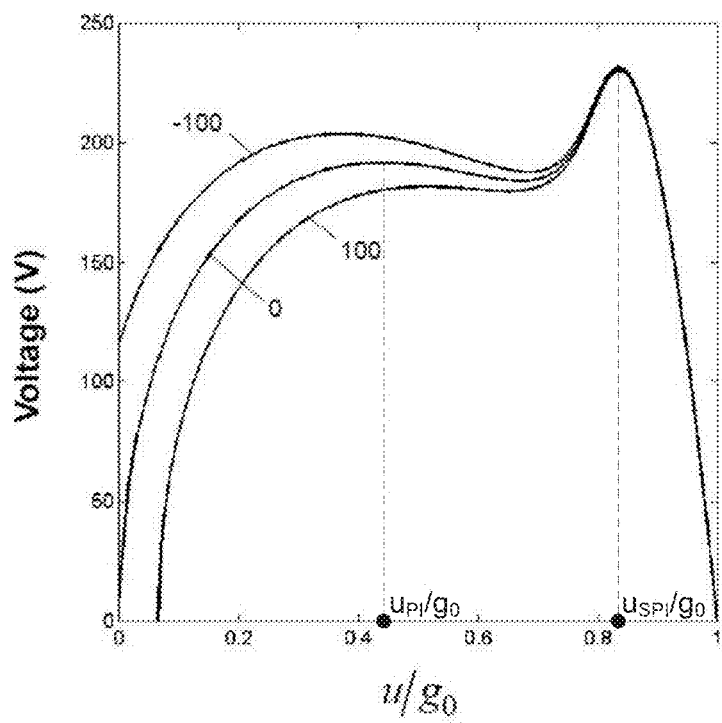
FIG. 5 is a graph illustrating calculated equilibrium curves (displacement-voltage dependence) of the device of the present invention for differing values of accelerations in g's.

The dependence between the axial displacement of the proof mass (normalized by the initial distance between the electrodes) and the actuation voltage is shown in FIG. 5. The results were obtained for the electrostatic gap of 5 μm and the initial elevation of the curved beams of 40 μm. In this case the ratio between the electrostatic gap and the maximally achievable displacement of the inextensible beam is $\eta=g_0/(2(L_S-L))$.

The presence of acceleration affects the pull-in and release values of the voltage. Namely, in the case of a positive acceleration the pull-in voltage is lower whereas for the negative acceleration (i.e., in the negative direction of the x-axis) the pull-in and release voltages are higher. Note that the influence of the acceleration on the primary pull-in voltage is more pronounced compared with its influence on the release and the secondary pull-in voltages. The reason is that at larger displacements the curved beams are more straightened and the suspension is stiffer, which makes it less sensitive to acceleration. The inventors' calculations show that for the adopted device parameters the bistability is preserved up to the accelerations of ±100 g.

Figure 6:
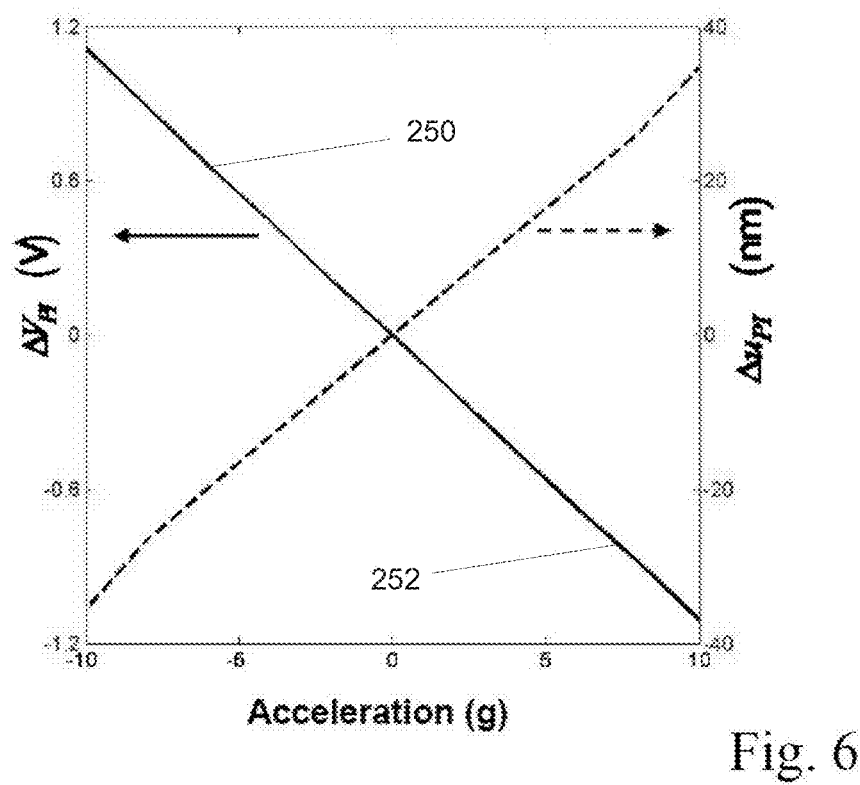
FIG. 6 is a graph illustrating calculated shift in the critical pull-in voltage (the voltage corresponding to the stability boundary) and the pull-in displacement of the device as a function of acceleration in g's.

Dependence of the change in the pull-in voltage $\Delta V_{PI}$ and pull-in displacement $\Delta u_{PI}$ on the acceleration is shown in FIG. 6. Line 250 represents the dependence of the pull-in voltage on acceleration. Line 252 represents the dependence of the pull-in displacement on acceleration. Note that the location of the critical primary pull-in, secondary pull-in and release points was found analytically from the condition dV/du=0. The voltage was expressed in terms of the proof mass displacement u and the forces $$d\hat{P}_x^{(L)}/d\hat{\Delta}_x, d\hat{P}_x^{(R)}/d\hat{\Delta}_x$$

$P_x^{(L)}$, $P_x^{(R)}$ from eq. (9). The derivatives were found by using the displacement derivative of both sides of eq. (4). One observes that despite that the forces provided by the suspension and the parallel-plate transducer are highly nonlinear, the change of the pull-in voltage with acceleration is close to linear. The deviation from linearity of the acceleration-pull-in voltage characteristic is 0.5% at a=±10 g. This feature makes the device to be attractive for the implementation as accelerometer. For the adopted parameters, the sensitivity of the device was found to be 0.11 V/g. Note that the tenfold increase of the proof mass increases the scale factor to 1.1 μV/μg at the expense of the dynamic range of the device, which is reduced in this case to ±20 g.

The pull-in collapse is an essentially dynamic phenomenon and dynamic behavior of the device after the loss of stability should be considered. Equation of motion of the proof mass is as follows $$m\ddot{u} + c\dot{u} + K_f u + 2P_x^{(L)} + 2P_x^{(R)} = ma + \frac{\varepsilon_0 A_e V^2}{2(g_0 - u)^2} \quad (11)$$

where c is the viscous damping coefficient. Since no explicit dependence between the forces $P_x^{(L)}$, $P_x^{(R)}$ and the displacement of the proof mass is available, direct numerical solution of eq. (11) would involve numerical solution of the algebraic equation (4) at each step of the time-integration of the differential equation.

Instead, the equation of motion was re-formulated in such a way that the implicit analytic relations between $P_x^{(L)}$, $P_x^{(R)}$ and u, which are actually nonlinear constraints, were used. Namely, eq. (11) was written in the form of four first-order ODE's)

$$\dot{y}_1 = y_2 \quad (12)$$

$$\dot{y}_2 = -\frac{c}{m} y_2 - \frac{K_f}{m} y_1 - \frac{2y_3}{m} - \frac{2y_4}{m} + a + \frac{\varepsilon_0 A_e V^2}{2m(g_0 - y_1)^2} \quad (13)$$

$$\dot{y}_3 = \dot{P}_x^{(L)}(y_2, y_3, y_4) \quad (14)$$

$$\dot{y}_4 = \dot{P}_x^{(R)}(y_2, y_3, y_4) \quad (15)$$

where the vector of state variables y={u, u̇, $P_x^{(L)}$, $P_x^{(R)}$} includes $\dot{P}_x^{(R)} \dot{P}_x^{(L)}$ the proof mass u̇ displacement, proof mass velocity and the forces associated with the left and right pair of the curved beams, respectively. To obtain the $\dot{P}_x^{(R)}$ time $\dot{P}_x^{(L)}$ derivatives in terms of $P_x^{(L)}$, $P_x^{(R)}$ and, the force-displacement relation (4) was differentiated with respect to time and the resulting equations were solved in terms of and to yield (14) and (15).

Figure 7:
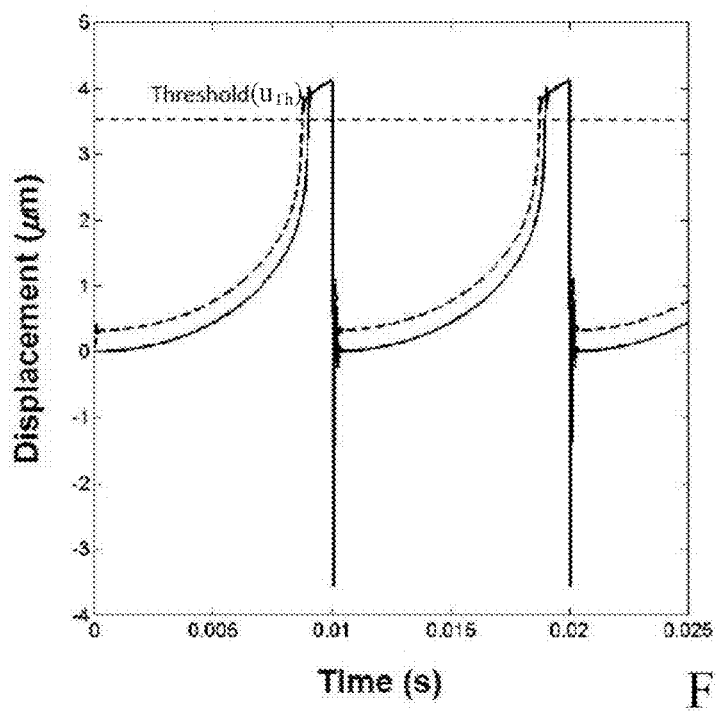
FIG. 7 is a graph illustrating a calculated time history of the proof mass for the case of zero acceleration and for the acceleration of 50 g, when the voltage is applied as a saw-tooth signal with frequency of 100 Hz.

The time history of the proof mass's displacement corresponding to the saw tooth voltage signal with the amplitude of 220 V and frequency of 100 Hz is shown in FIG. 7 for the case of zero acceleration and the positive acceleration of 50 g. One observes that the linear quasistatic increase of the voltage results in the increase of the proof mass displacement up to the critical value, followed by the pull-in collapse toward the second stable equilibrium configuration. When the voltage is switched off, the proof mass switches back and the first equilibrium configuration is reached after the decay of the vibrations initiated by the sudden removal of the voltage.

In accordance with FIG. 7, the following example of a measuring scenario is provided. First, the actuating probing voltage, which is a periodic saw tooth function of time, is applied resulting in pull-in instability and the proof mass snapping toward the second stable equilibrium configuration. The detection of the proof mass snapping event is realized using a displacement threshold approach. Namely, the instability event is considered to take place when the displacement of the proof mass becomes larger than a certain prescribed value $u_{Th}$ hereafter refereed as the displacement threshold. In this context, the measurement actually has a digital character since the dependence between the actual displacement of the proof mass and the acceleration is not measured. Note that the threshold value of the displacement should be chosen such that $u_{PI} < u_{Th} < u_{SPI}$, where $u_{PI}$ and $u_{SPI}$ are the pull-in and the secondary pull-in values of the displacement, respectively (see FIG. 5). Any of the existing sensing approaches, e.g., capacitive or optical interrogation, can be implemented for the detection of the pull-in (snapping) event. We define the value of the voltage corresponding to the threshold displacement as the threshold pull-in voltage and denote it by $V_{Th}$. In the presence of acceleration, the threshold voltage is varied. The deviation $\Delta V_{Th}$ of the threshold voltage from the zero-acceleration value can serve therefore as a measure of the acceleration.

Due to a finite rate of the probing voltage increase and finite velocity of the proof mass during the pull-in collapse, this threshold voltage differs from the theoretical static pull-in voltage $V_{Th}$ defined as the local maximum of the equilibrium curve corresponding to the minimal displacement, FIG. 5. The difference between $V_{Th}$ and $V_{PI}$ is larger for higher frequency of the probing voltage. However, the inventors' calculations show that the dependence between the acceleration and the threshold voltage is close to linear and is very similar to that shown in FIG. 6.

Various embodiments and aspects of the present invention as delineated hereinabove and as claimed in the claims section below find experimental and calculated support in the following examples.

Figure 8:
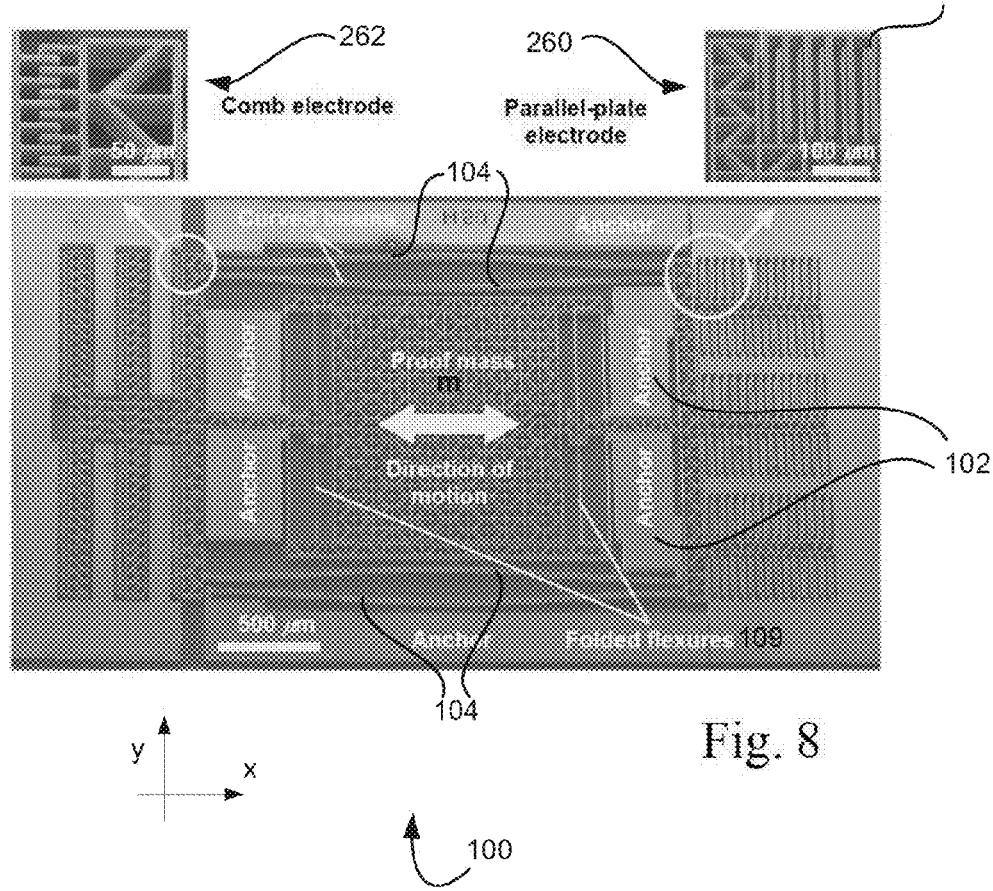
FIG. 8 is an illustration of the fabricated device of the present invention.

Referring now to FIG. 8, there is illustrated a fabricated device of the present invention.

Following the design, devices of the present invention were fabricated using a silicon on insulator (SOI) wafer as a starting material and a deep reactive ion etching (DRIE) based process. The process begins with a standard SOI wafer with (100) front surface orientation. The wafer consisted 30 μm thick Si device layer covered by 1 μm layer of thermally grown silicon dioxide, 400 μm thick handle layer and 4 μm thick buried silicon dioxide (BOX) layer. The main steps of the fabrication are shortly described below. After cleaning the wafer a photo-resist (PR) was spun onto the front surface of the wafer and soft baked on a hot plate. The lithography step consisted of a UV exposure using a Karl Suss MA-6 exposure mask aligner on the front side of the mask, development of the PR and a hard bake. Next, the reactive ion etching (RIE) of the $SiO_2$ hard mask layer was performed using Nextral (UNAXIS) NE 860 Reactive Ion Etcher machine.

DRIE of the device layer was then performed using Plasma-Therm (UNAXIS) SLR-770 Inductively Coupled Plasma Etcher (ICP). The BOX layer was used as an etch stop layer. The exposed silicon-dioxide of the BOX layer was then removed by RIE. This is followed by the removal of the residuals of PR using acetone, cleaning and drying. The wafer was then cleaved into individual dies and each die was released using the wet hydro-fluoric (HF) acid chemistry. The wafer was sub-divided into ~60 individual dies, each die contained 6 devices. Note that at the current stage only front-side (device layer) etching was carried out. Optionally, the process further includes back side processing. Back side processing provides a cavity under the device containing larger proof mass. In addition, openings in the handle prevent stiction between the device and the substrate. Scanning electron microscope (SEM) micrograph of the fabricated device 100 is shown in FIG. 8. A parallel-plate actuator (electrode) 260 and comb drive actuator (electrode) 262 were incorporated into the same device to provide a possibility of the operation by both types of transducers. The device 100 of FIG. 8 is a specific embodiment of the device 100 of FIG. 1. The base 102 of FIG. 1 is herein called "anchor", and the folded suspension 108 is made of a plurality of folded flexures 109.

The structures were operated at room temperature and under ambient air conditions. The experimental setup included an optical microscope (Mitutoyo S70 0/100, switchable microscope with long working distance ×50 objective) mounted on a wafer prober (Karl Suss PSM6), an anti-vibration table (Kinetic systems, vibraplane) and a high-resolution 1600×1200 pixels CCD camera (UI-2250SE-M). Linearly increasing and decreasing voltages provided by an arbitrary function generator (TGA1241) combined with a custom built voltage amplifier were applied to the device. In all cases a linear voltage sweep with a rise time of 20 s was used. The in-plane motion was registered and video-recorded at the rate of 10 fps. The movie was then split into frames, each corresponding to a specific value of the voltage and the voltage-displacements characteristics were constructed by means of the image processing using a custom-built edge tracking procedure implemented in Matlab.

When the beam is almost completely straightened and the deflections in the transversal (y) directions are close to the initial elevation of the structure, the displacement of the beam's end in the x direction is much smaller. The ratio between the displacement in the y direction and the displacement in the x direction is very small, as suggested by eq. (8). For this reason the beam can serve not only as a compliant constraint but also as a motion amplifier, as will be now explained.

The beam loaded in the transverse direction can be used as a motion de-amplifier or as a force amplifier (Ya'akobovitz, A., Krylov, S., Hanein, Y., 2010, "Nanoscale Displacement Measurement of Electrostatically Actuated Micro-Devices using Optical Microscopy and Digital Image Correlation," *Sensors and Actuators A*, 162, pp. 1-7). In the device 100 of the present invention, the displacements of the proof mass m in the x-direction (hereafter refereed as "actuator displacement") are of the order of several micro meters, whereas the deflection in the y-direction of the midpoint of the curved beam (refereed as "beam's displacement") is of the order of tens of μm. In order to improve the resolution of our measurements, the amplified [Ya'akobovitz, A., Krylov, S., 2010, "Toward Sensitivity Enhancement of MEMS Accelerometers Using Mechanical Amplification Mechanism," *IEEE Sensors Journal*, 10(8), pp. 1311-1319] transversal deflection Δy of the midpoint of the beam was captured during experiments and the displacements in the x direction were calculated using eq. (8). Although this equation is approximate and neglects the extensibility of the beam's axis, it was found to provide good results. All the results for the actuator displacements presented hereafter were obtained using this approach until otherwise stated.

First, the devices actuated by the comb drive transducer were operated. Since the actuating force provided by a comb drive transducer is practically independent on the displacements, this device is convenient for the characterization of the mechanical properties of the suspension. The voltage was applied as a periodic unipolar saw-tooth wave with the amplitude of 80 V (peak to peak), offset of 40 V and the voltage rise time of 20 sec. The nominal (as designed) length and width of the folded flexures was 500 μm and 5 μm, respectively. The length, width and initial elevation of the curves beams were 2000 μm, 4 μm and 55 μm, respectively.

Figure 9:
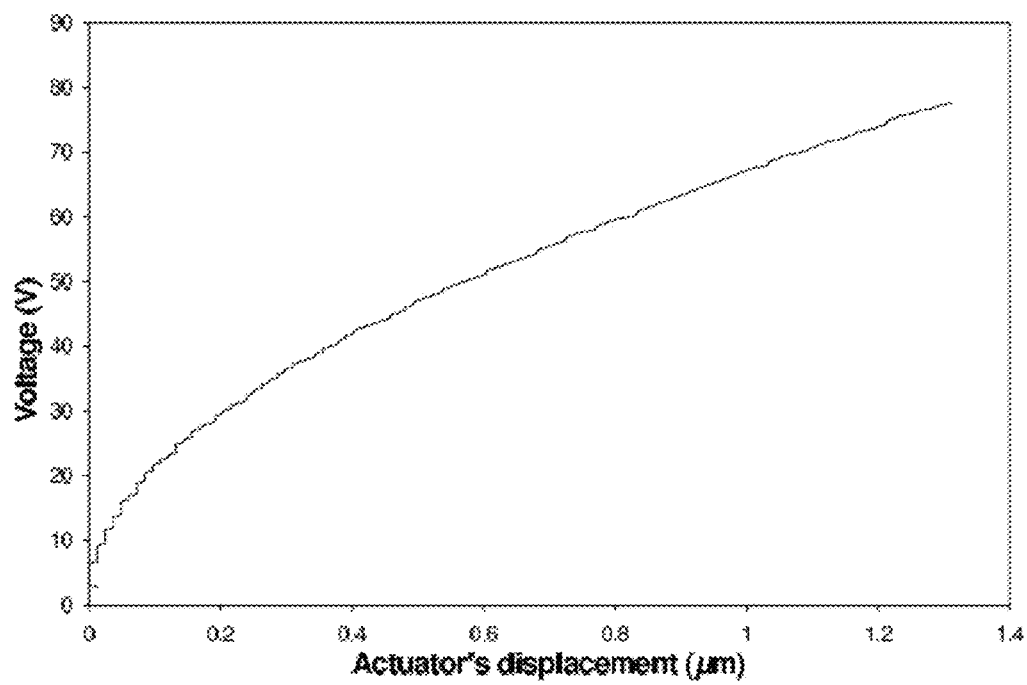
FIG. 9 is a graph illustrating measured voltage-displacement dependence for a device of the present invention actuated by a comb drive.
Figure 10:
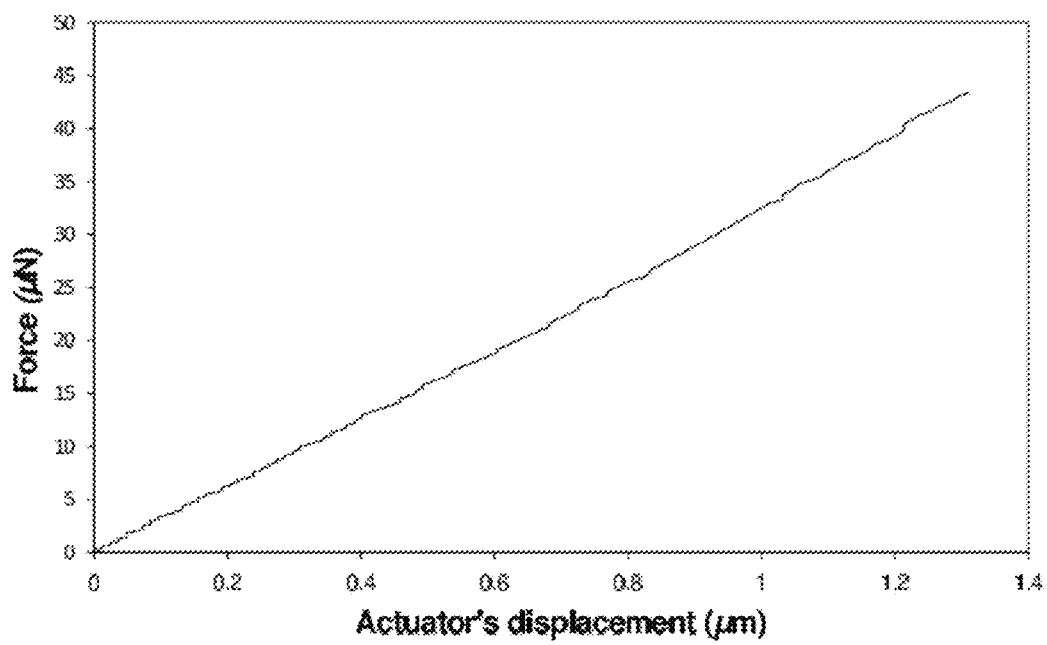
FIG. 10 is a graph illustrating measured force-displacement dependence for a device of the present invention actuated by a comb drive.

The voltage-displacement characteristic of the device actuated by a comb-drive transducer is shown in FIG. 9. The dependence between the actuating force and the displacement of the device is shown in FIG. 10. Note that the actuating force was calculated using the simplest formula $F_c = \epsilon_0 NhV^2/g_0$, where h=30 μm is the thickness of the SOI device layer, $g_0$=5 μm is the nominal distance between the electrodes (note that the actual distance, which was measured to be 7.3 μm was used in calculations) and N=198 is the number of combs. One observes that the dependence between the actuating force and the actuator displacement is close to linear. This result suggests that the displacement of the actuator has not reached the saturation point, the force provided by the comb drive transducer is not sufficient for the straightening of the curved suspension beams, and the deformation of the suspensions is predominantly of the bending type. Note that for the beam dimensions of this specific device and under the assumption of the beam's axis inextensibility the maximally achievable displacement is Δx=3.62 μm.

Figure 11:
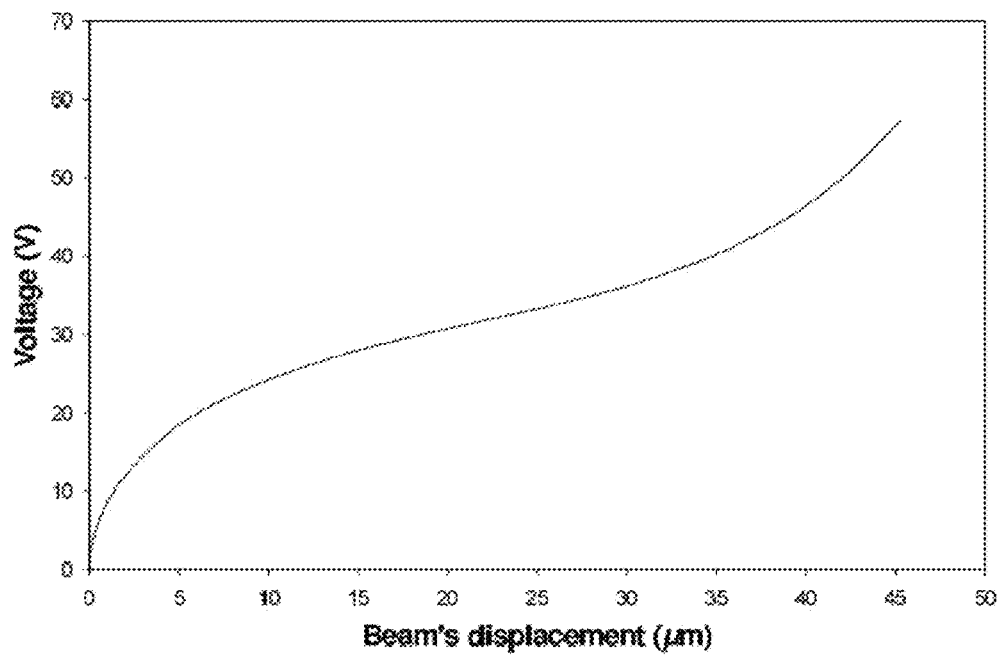
FIG. 11 is a graph illustrating measured voltage-displacement dependence for a device of the present invention actuated by a parallel-plate transducer.
Figure 12A:
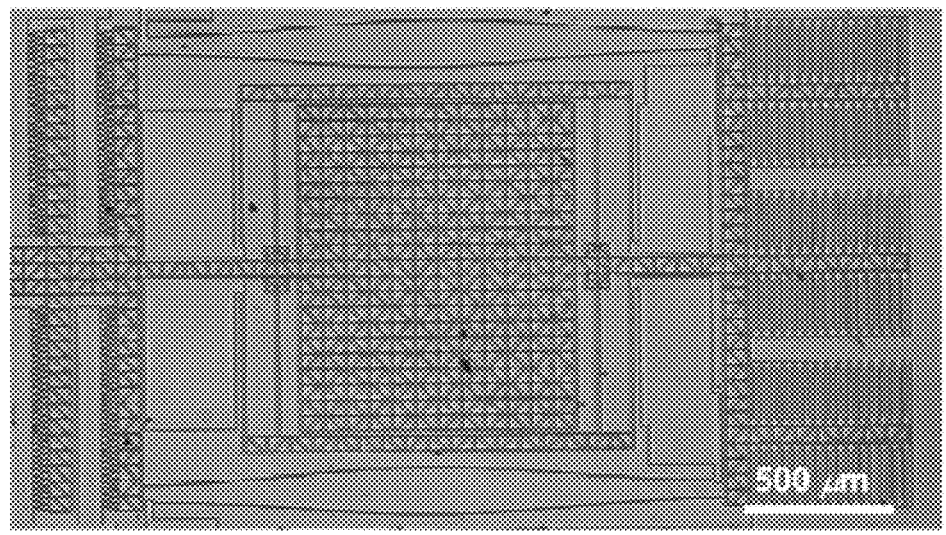
FIGS. 12a-12b are snapshots of a device according to some embodiments of the present invention before deformation (FIG. 12a) and after deformation (FIG. 12b)
Figure 12B:
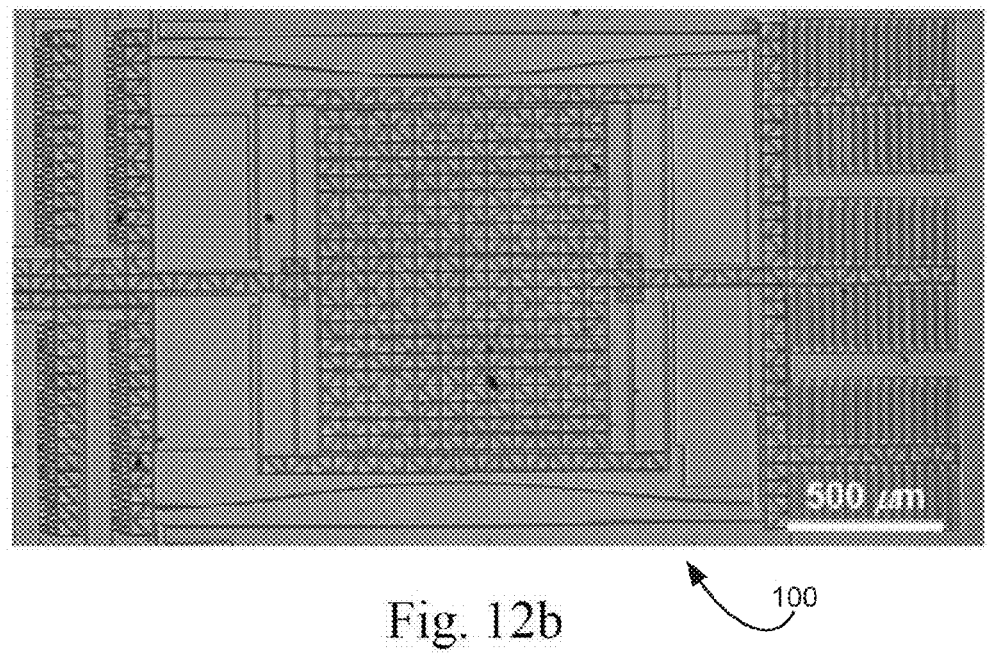

Next, the devices were operated by parallel-plate electrodes. The dependence between the voltage applied to the parallel-plate transducer and the transversal displacement of the midpoint of the curved beam is shown in FIG. 11. Since the parallel plate transducer provides larger force than the comb drive of similar footprint, in this case the curved beams were straightened to a large extent and the characteristic exhibited the tendency of the saturation. In accordance with FIG. 11, the midpoint deflection of the beam is 45 μm while the initial elevation of the beam is 55 μm. One may conclude that even in the case when the beam is not completely straightened, the influence of the stiffening is very pronounced. The snapshots of the device before and after application of the force are shown in FIGS. 12a and 12b, respectively. The straightening of two of four curved suspension beams is clearly observed.

Figure 13:
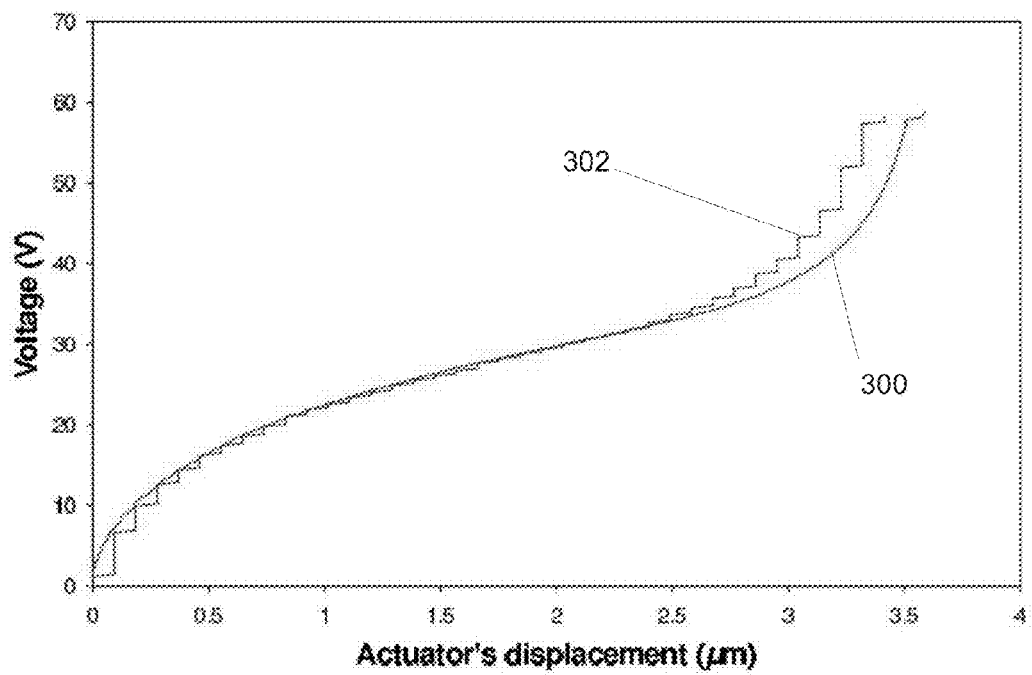
FIG. 13 illustrates a comparison of calculated and experimental voltage-displacement curves of a device of the present invention.

In order to verify the applicability of the approach based on the calculation of the actuator's displacement from the measurements of the amplified deflection of the curved beam, the actuator displacements obtained using eq. (8) (curve 300) were compared with the directly measured values (curve 302). Results of the comparison are shown in FIG. 13. Good agreement is observed. Note that since the displacement of the actuator is about an order of magnitude smaller than the transverse deflection of the beam, the curve corresponding to the direct measurement is more affected by inaccuracies of the imaging procedure. In this context, it can be argued that the registration of the mechanically amplified displacements can be beneficial since it may improve the signal to noise ratio of the sensing [Ya'akobovitz, A., Krylov, S., 2010, "Toward Sensitivity Enhancement of MEMS Accelerometers Using Mechanical Amplification Mechanism," *IEEE Sensors Journal*, 10(8), pp. 1311-1319].

Figure 14:
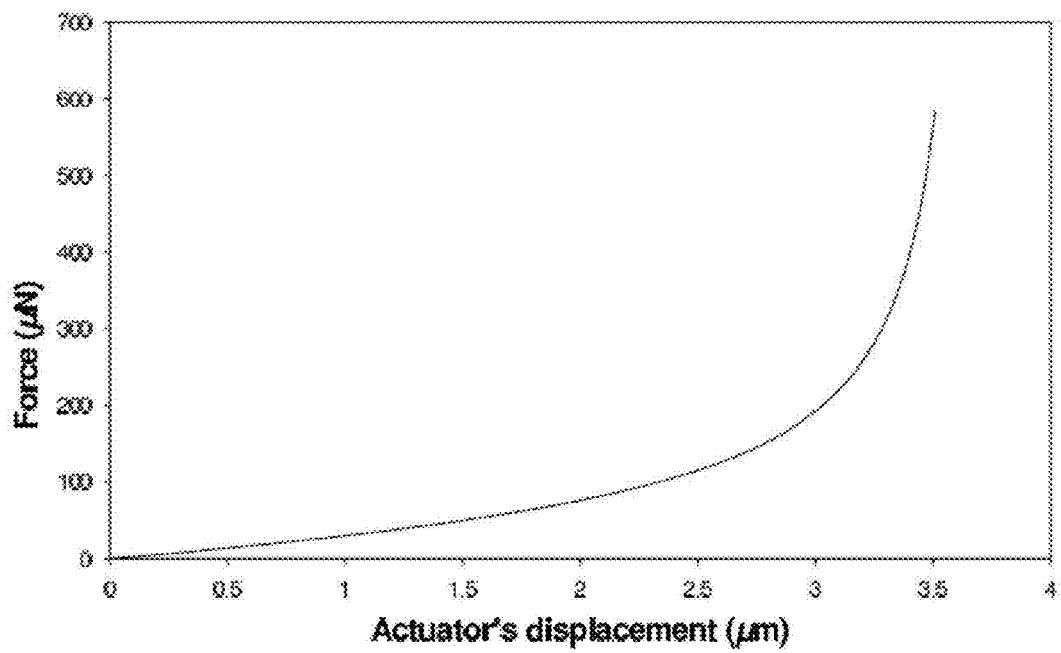
FIG. 14 is a graph illustrating measured force-displacement curve of a device of the present invention actuated by a parallel-plate transducer.

The dependence between the actuating force provided by the parallel plate transducer and the displacement of the device is shown in FIG. 14. The force of the transducer was calculated using the simplest parallel capacitor formula $F_{PP}=0.5\epsilon_0 hL_e V^2/(g_0-u)^2$, where the total length of 90 parallel plate 175 μm long electrodes is $L_e$=1575 μm. One observes that the force-displacement characteristic of the device is of the stiffening saturation type. Note that when compared to the single beam straightened by a force applied to its end, the curve shown in FIG. 14 incorporates the stiffness of the straightened and compressed beams and the nonlinearity of the suspension is more pronounced. In addition, the curves incorporate also the stiffness of the folded suspension.

FIG. 13 indicates that the voltage-displacement dependence is monotonous and no bistability of the device is observed. The inventors attribute discrepancy between the experimental results and the theoretical predictions to the deviations in the actual device dimensions from the nominal values. Namely, it was found that due to the undercut originating in the DRIE of the device layer, the actual initial distance between the movable and stationary electrodes is 6.9 μm and is significantly larger than the designed value of 5 μm. In addition, a possibility of deviation in the initial elevation of the curved beams, for example, as a result of small residual stress of variation in ambient temperature, cannot be disregarded. Since, in accordance with the model, the ratio $\eta=g_0/\Delta_x^{MAX}$ between the electrostatic gap to the maximally achievable displacement of the actuator is the main parameter, which defines whether the bistability is present, the influence of the deviation in the electrostatic gap value can be significant. In order to illustrate the influence of the distance between the electrodes, the "semi experimental" voltage-deflection dependence was built, which incorporates experimentally extracted stiffness characteristics of the suspension and the electrostatic force re-scaled for the smaller distance between the electrodes.

During the quasistatic loading of the device, it is in equilibrium and the "mechanical" restoring force provided by the suspension is equilibrated by the electrostatic force of the transducer. Using the simplest parallel-capacitor formula for the electrostatic force, the mechanical force $F_M(u)$ can be expressed in terms of the experimental values of the displacement u and the measured voltage $V_{exp}(u)$ and for the actual distance between the electrodes, $g_{exp}$ $$F_M(u) = \frac{\epsilon_0 A V_{exp}^2}{2(g_{exp} - u)^2} \quad (16)$$

In the case of a different electrostatic gap g the dependence V(u) is different and the equilibrium equation (16) takes the form $$F_M(u) = \frac{\epsilon_0 A V^2}{2(g - u)^2} \quad (17)$$

Since $F_M(u)$ is only function of the displacement, the values of the force in the left hand side of eqs. (16) and (17) are identical for the same values of the displacement. Equilibrating the right hand sides of these equations, we obtain the dependence for the actuating voltage as a function of the displacement, which is valid for the amended electrostatic gap $$V(u) = V_{exp}(u) \frac{g - u}{g_{exp} - u} \quad (18)$$

Figure 15:
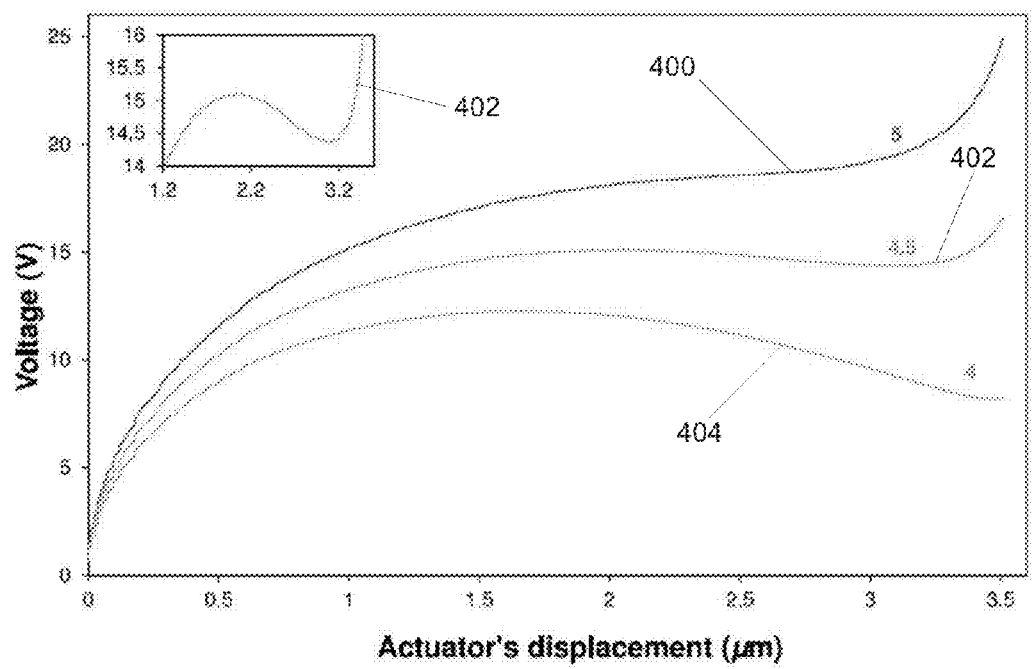
FIG. 15 is a graph illustrating voltage-displacement curves of a device of the present invention, calculated by using measured values of the displacement (u), applied voltage ($V_{exp}$), and distance between electrodes ($g_{exp}$)

The results obtained based on eq. (18) with measured values of u and $V_{exp}(u)$ are shown in FIG. 15. One observes that the decrease of the electrostatic gap is expected to result in appearance of the bistablity (e.g. from 5 μm (curve 400) to 4.5 μm (curve 402)). On the other hand, when the gap is reduced below a certain value (for example, below 4.5 μm down to 4 μm, as illustrated in curve 404), the contact between the movable and stationary electrodes takes place before the curved beam is straightened. In this case the bistability is suppressed. The enlarged view of the bistability region corresponding to the curve 402 is shown in the inset FIG. 15. One observes that for the device under consideration, the bistability range in terms of the actuating voltage is close to 20 V. In terms of the electrostatic gap, the bistablity takes place in the range of the distances between 4.3 μm and up to 4.8 μm.

Figure 16:
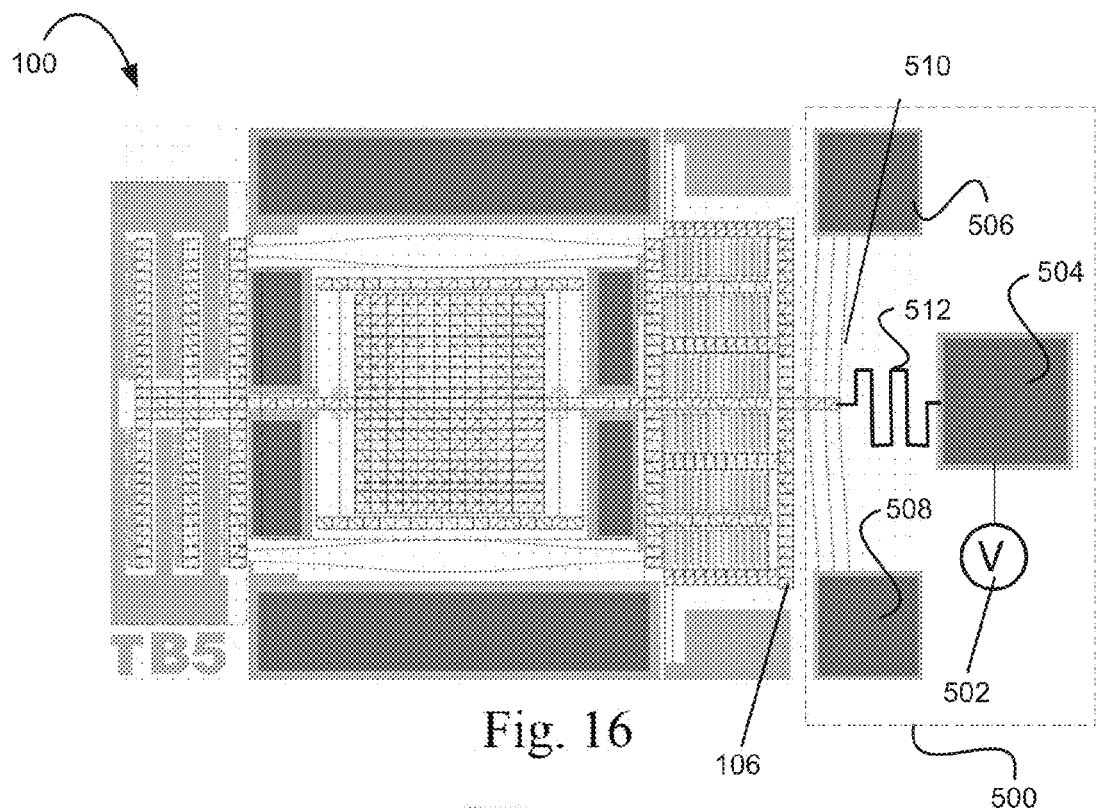
FIG. 16 is a drawing illustrating a layout of a device of the present invention, incorporating the active tuning of the electrostatic gap by means of a thermal actuator.

Referring now to FIG. 16, there is illustrated drawing illustrating a layout of a device of the present invention, incorporating the active tuning of the electrostatic gap by means of a thermal actuator. One of the possible limitations of the actuation scenario described above is high sensitivity of the voltage-displacement characteristic to the initial distance between the electrodes. This distance may be uncertain due to low tolerances of micromachining.

A device 100 of the present invention is presented in FIG. 16, and is similar to the devices of FIG. 1 and FIG. 8. However, the device of FIG. 16 incorporates an active tuning mechanism allowing active change of the distance between the parallel-plate electrodes. Specifically, before the operation of the device 100, the position of the fixed (stationary) electrode(s) 106 is adjusted via a thermal actuator 500. The range of the displacements actuated by the thermal actuator 500 is of the order of 2-3 μm, which is sufficient for the adjustment of the gap between the fixed and moving electrodes (described above), in order to tune the location of the boundary between the two stable regions of the device. The thermal actuator 500 is optionally controlled by the controlled application of voltage 502 thereto.

According to a non-limiting example, the thermal actuator 500 includes a central pad 504, two side pads 506 and 508 located on opposite sides of the central pad 504, and one or more curved electrically conductive beams, generally 510, and conductive wire 512. Each of the curved beams 510 has one end joined to the first side pad 506 and another end joined to the second side pad 508. A central portion of each curved beam 510 is joined to the fixed electrode(s) 106 of the device of the present invention, such that the position of the fixed electrodes can be adjusted by changing the curvature of the curved beam(s) 510. The voltage 502 is applied to the central pad 504, while other voltages are applied to the side pads 506 and 508. The conductive wire 512 is joined to the central pad 504 and to the center of curved beam(s) 510, so as to apply the voltage 502 to the curved beam(s) 510. If the voltage 502 applied to the central pad 504 is different than the voltages applied to the side pads 506 and 508, electric currents pass from the center of the curved beams 510 to the ends of the curved beams 510. While the electric currents pass through the curved beams 510, the resistance of the curved beams 510 causes the temperature of the curved beams 510 to rise, bringing about an expansion of the curved beams 510. The expansion causes an increase in the curvature of the curved beams 510, which in turn brings about a displacement of the fixed electrode(s) 106. Therefore by controlling the voltages applied to the central pad 504 and the side pads 510, the position of the fixed electrode(s) 106 can be controlled. Optionally, the conductive wire 512 is stretchable and is fabricated in a shape of a flexible serpentine spring.

In a variant, the voltage 502 applied to the central pad 504 is also the voltage applied to control the charging of the fixed electrode 106. This is true when the curved beams 510 are in electrical contact with a section of the fixed electrode(s) 106, and when the voltages applied to the side pads (506 and 508) are equal. Therefore, the voltage 502 can be used to control the charging of the fixed electrode(s) 106, while the difference between the voltage 502 and the voltages applied to the side pads (506 and 508) is used to control the curvature of the curved beams 510 and therefore to control the position of the fixed electrode(s) 106. As a way of example, it is hypothesized that a voltage of 50 V needs to be applied in order to charge the fixed electrode(s) 106, while a voltage of 10 V needs be applied to the flexible wire(s) 510 (between the center and the sides of the each wire) in order to achieve a desired curvature of the flexible wires 510. For this purpose, the voltage 502 applied to the central pad (and therefore to the fixed electrode(s) 106) may be set to 50 V, while a voltage of 40 V may be applied to each of the side pads 506 and 508. If the voltage 502 applied to the fixed electrode needs to be varied (e.g. time dependent voltage), then the voltage applied to each of the side pads 506 and 508 is to be varied accordingly, in order to keep the voltage difference between the center and the sides of the curved wire 106 constant, and ensure that the fixed electrode 106 does not move during the sensing operation of the device 100.

Figure 17:
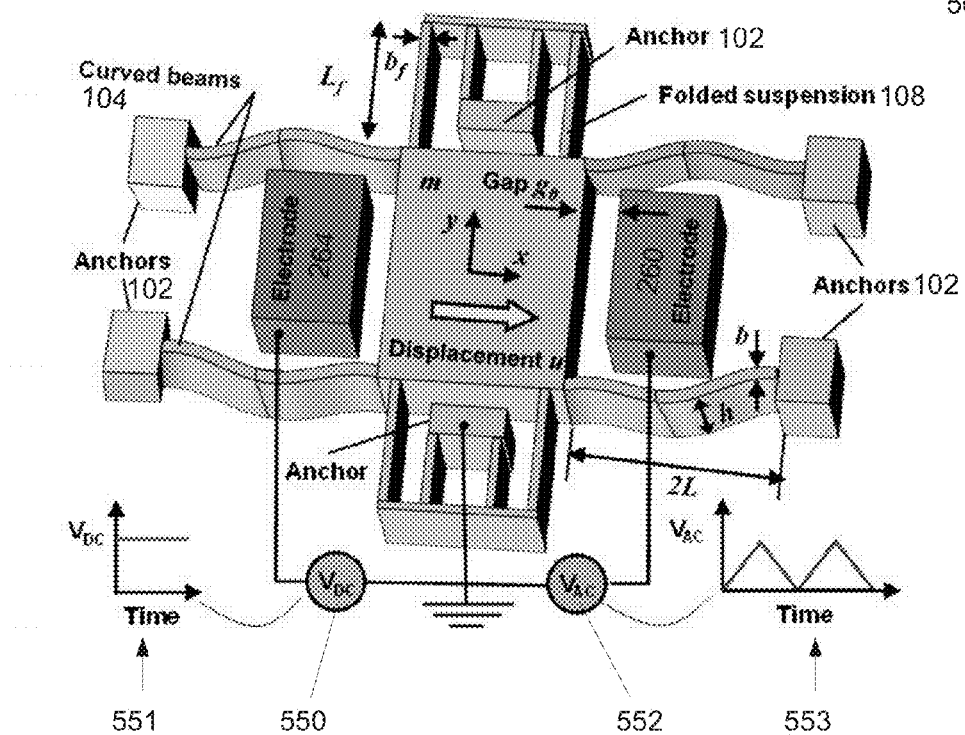
FIG. 17 is a schematic drawing of a device, having two parallel plate electrodes, one on each side of the proof mass.
Figure 18:
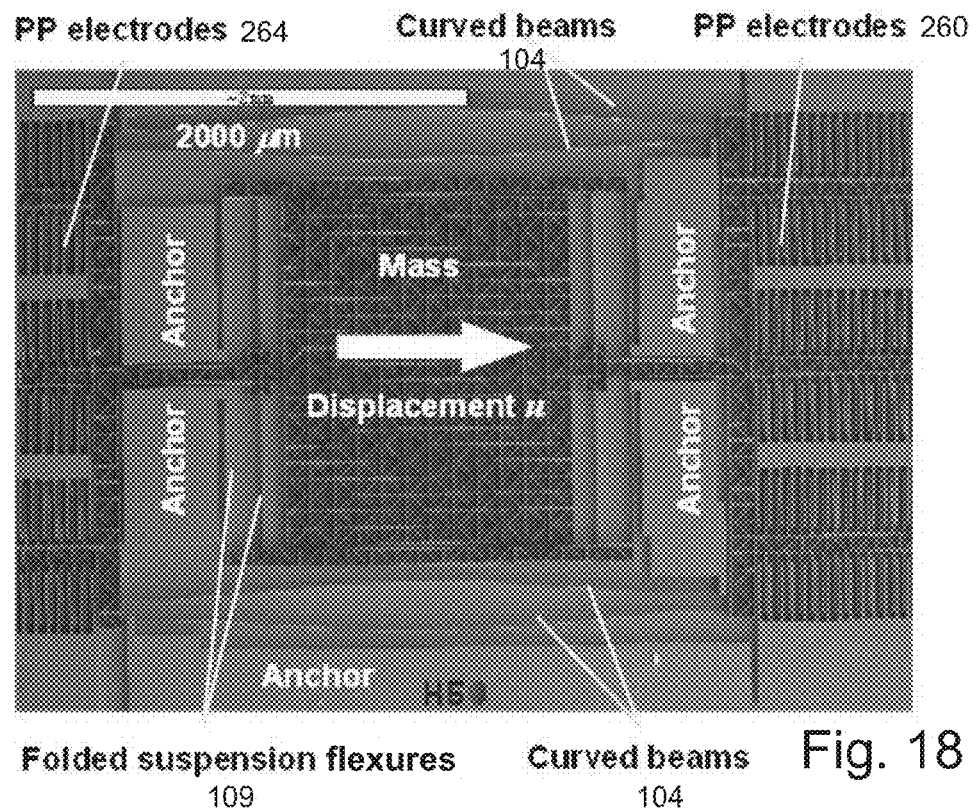
FIG. 18 is a scanning electron micrograph of a device according to FIG. 17, fabricated by the inventors.

Another approach, illustrated by FIGS. 17, 18, 19a-19b and demonstrated experimentally by the inventors, overcomes the difficulty related to low fabrication tolerances. FIG. 17 is a schematic drawing illustrating a device of the present invention, having two sets of parallel-plate transducers. FIG. 18 is scanning electron micrograph of the fabricated device of FIG. 17.

Figure 19A:
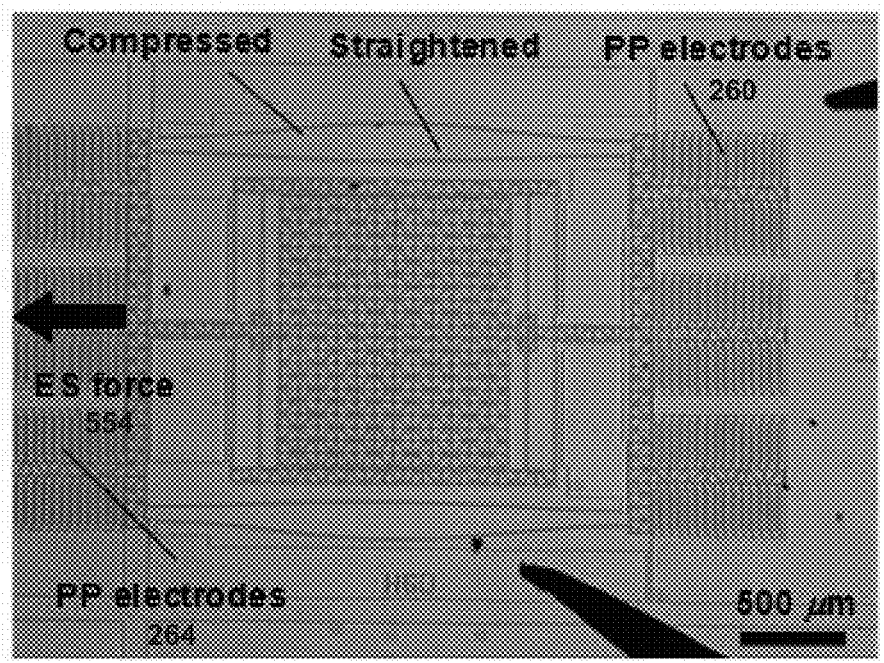
FIGS. 19a and 19b are scanning electron micrographs of the device of FIG. 18 in its two stable configurations.
Figure 19B:
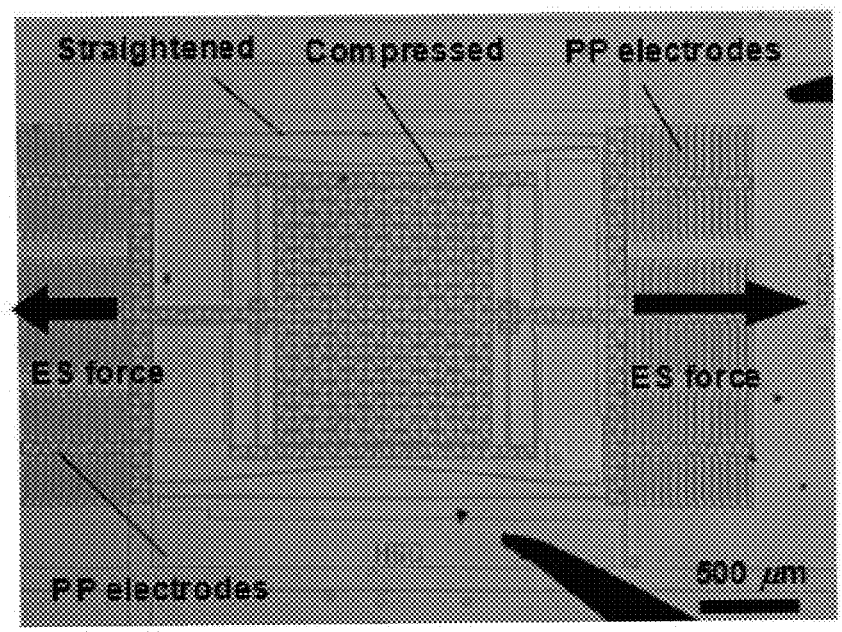

According to this approach, two parallel-plate electrodes are used to bring about the bistability of the actuator. A device of the present invention, used in this incorporates two sets of parallel-plate electrodes, i.e., the set of comb-drive transducers 262 of the device of FIG. 8 is replaced by parallel-plate transducers 264. In the framework of this operational scenario, a constant DC 550 (the time dependence on which is illustrated by graph 551) voltage is applied to one set of the electrodes 264. Then, a linearly increasing (saw-tooth) voltage 552 (the time dependence on which is illustrated by graph 553) is applied to the other set of the electrodes 260. The DC voltage changes the level of the nonlinearity of the device and can be chosen such that bistability of the device is obtained even for the case when the operation of a device having parallel plate electrodes on one side (such as the device of FIG. 8) does not result in bistability. FIGS. 19a and 19b are optical micrographs of the actuated device of FIG. 18. In FIG. 19a, a first stable configuration is shown, in which the control DC voltage is applied to the left electrode 264, generating a leftward electrostatic (ES) force 554. In FIG. 19b, a second stable configuration is illustrated, in which the AC voltage is applied to the right electrode 260 to generate a rightward electrostatic (ES) force 556.

Figure 20A:
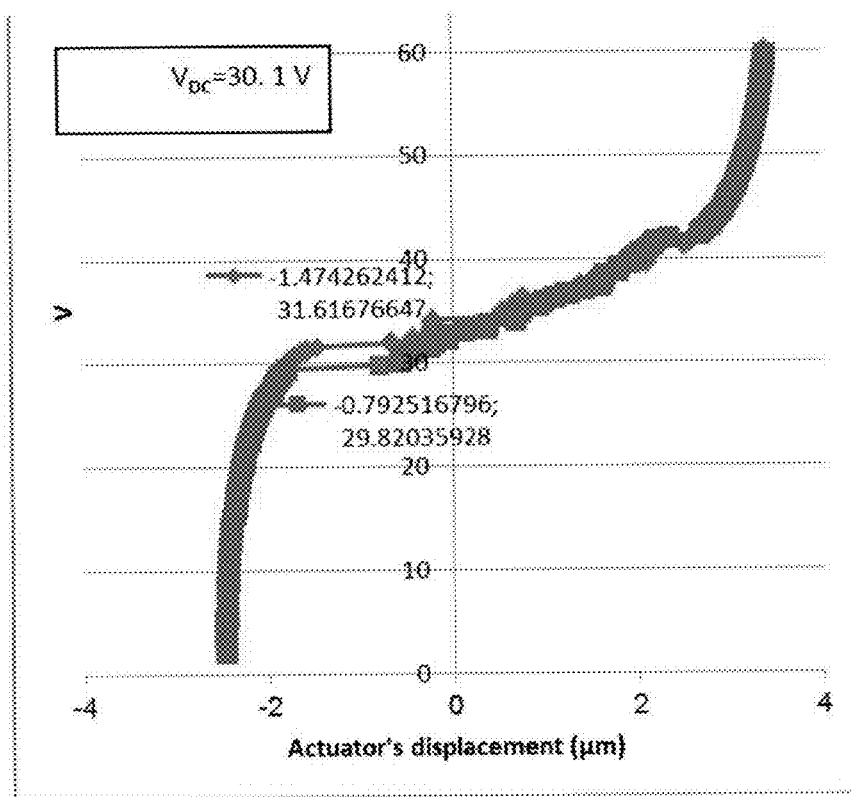
FIGS. 20a-20c are graphs illustrating voltage-displacement dependence for different values of the DC voltage applied to the left parallel-plate electrode in a device having two sets of parallel plate electrodes.
Figure 20B:
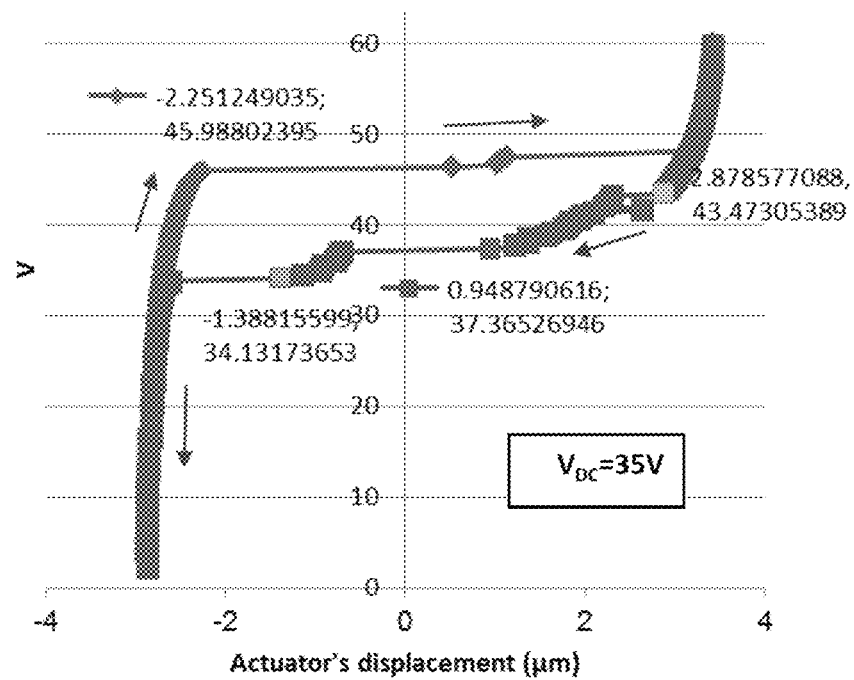
Figure 20C:
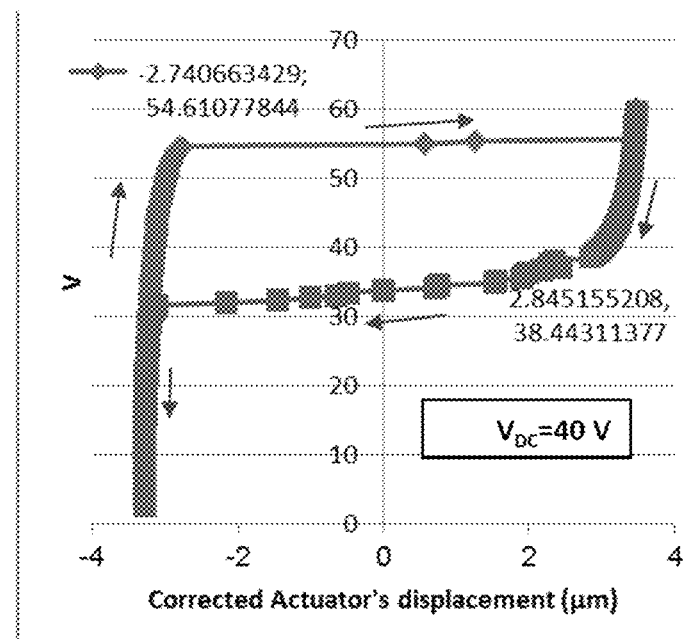
Figure 21A:
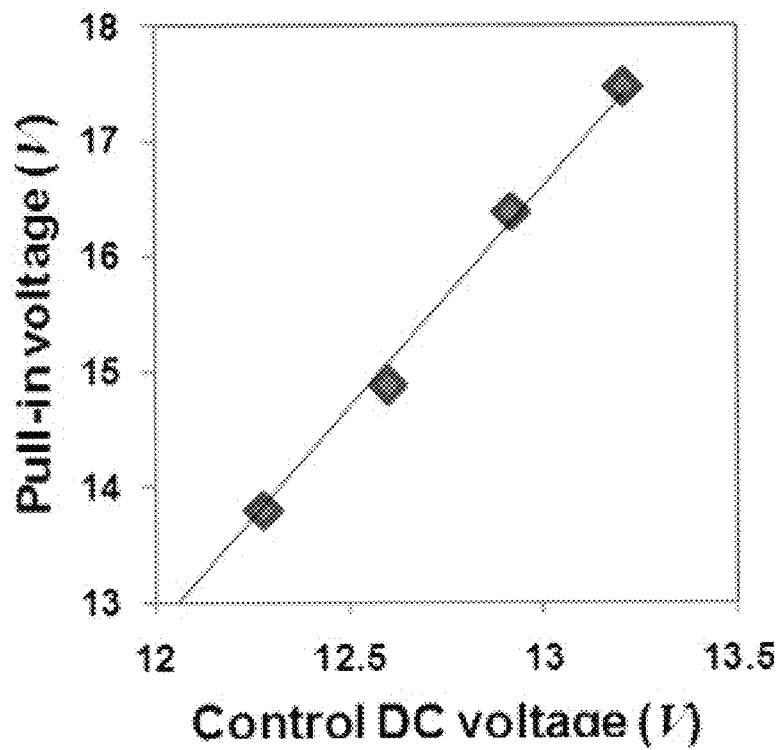
FIGS. 21a and 21b are graphs illustrating the experimentally determined dependence between the control DC voltage applied on one of the parallel plate electrodes of FIGS. 17 and 18 and the pull-in voltages (FIG. 21a), and between the corresponding force applied by the control electrode and the pull-in voltage (FIG. 21b).
Figure 21B:
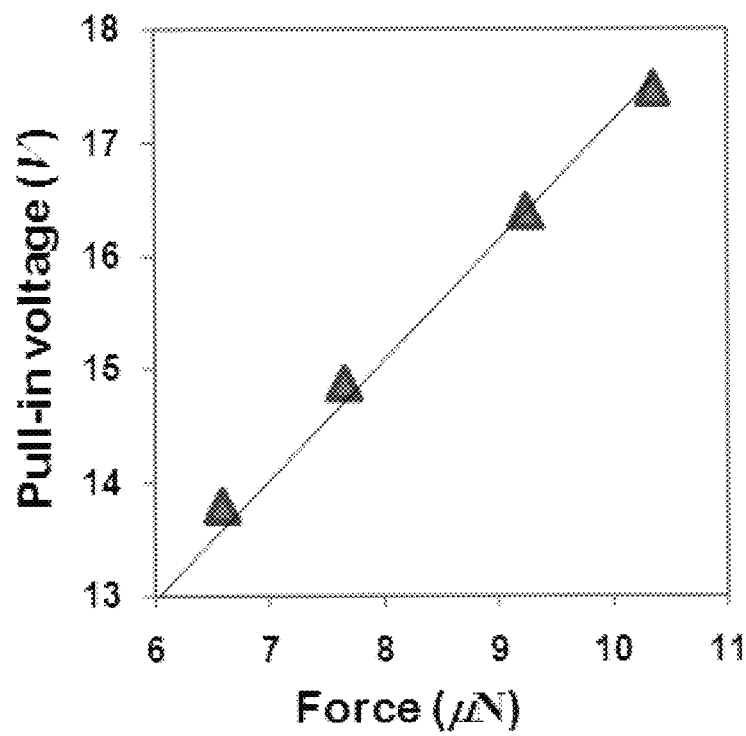

The tuning of bistability is illustrated in FIGS. 20a-c. A triangular voltage signal with the amplitude Vpp=60V (peak to peak) was applied on the right electrode and different DC voltages were applied on the left electrode, namely 20.1, 25, 27.5, and 30.1, 35, and 40 V. While the device was not bistable at lower values of the DC voltage, it became bistable at the DC (control) voltages higher than or equal to $V_{DC}$=30.1 V (i.e. for 30.1, 35, 40 V). The experimental dependence between the control DC and the pull-in voltages (a) and between the corresponding force and the pull-in voltage (b) of the device with two parallel-plate electrodes is shown in FIGS. 21a and 21b, respectively. Different DC voltages were applied to the left parallel-plate electrode. The bistability is preserved within a large range of the DC voltages, as shown in FIG. 21a. To estimate the influence of the external force (e.g., engendered by acceleration), the dependence between the pre-loading force (calculated using the parallel capacitor formula) and the pull-in voltage was obtained, as shown in FIG. 21b. One observes that the sensitivity of the device is approximately 1.1 V/µN. To estimate the possible performance of the device as an accelerometer, assume that Si proof mass has the dimensions 2000×2000×100 µm3 and has the mass of 0.93×10−6 kg. In this case the estimated scale factor of the device is 10.1 V/g.

Figure 22A:
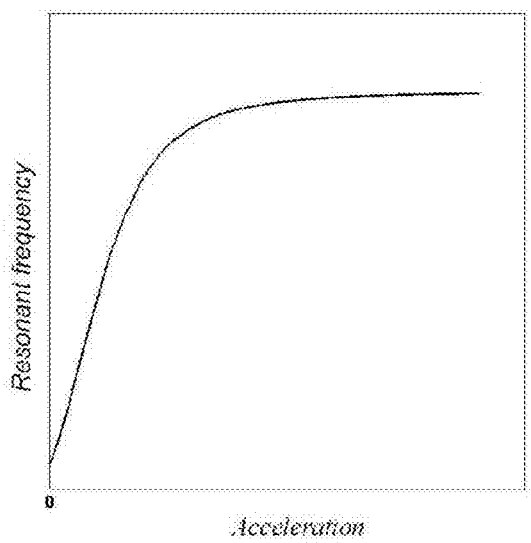
FIGS. 22a-22b are graphs illustrating (a) dependence of the resonant frequency of the proof mass on the acceleration and (b) dependence of the resonant frequency of the proof mass (continuous curve) and the derivative of the resonant frequency of the proof mass on the proof mass' normalized displacement (resonant frequency sensitivity)
Figure 22B:
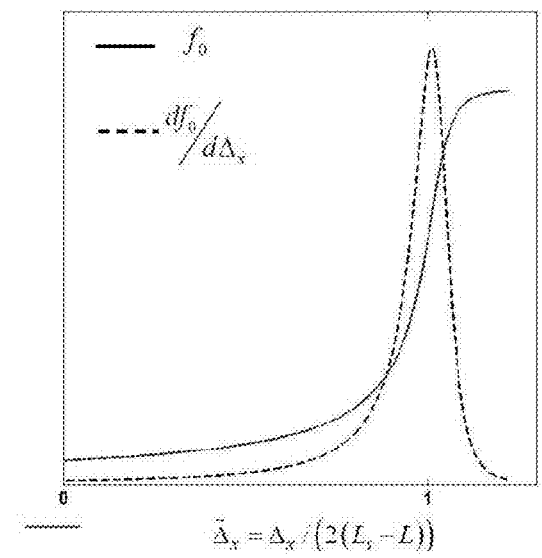
Figure 23:
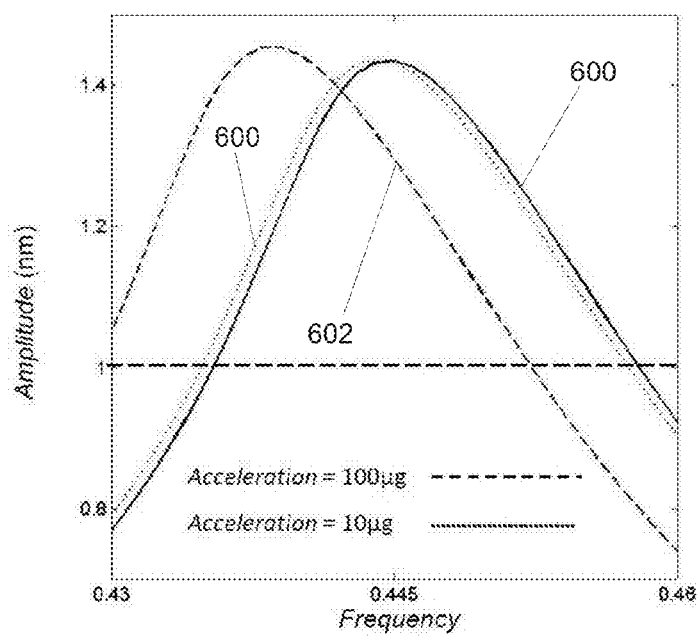

Reference is now made to FIGS. 22a, 22b, and 23, in order to describe another embodiment of the present invention, in which force/acceleration is determined by monitoring a resonant frequency of the device of FIG. 1.

According to a further embodiment of the present invention, a technique is provided for extraction of acceleration or force via frequency monitoring of the device. Strong dependence of the stiffness of the initially curved suspension beam on the proof mass deflection and acceleration makes it possible to operate the device not only statically but also dynamically. The acceleration acting on the proof mass results in the tension in the suspension beams. The device (the proof mass) is made to oscillate in the vicinity of one of its two stable configurations and is excited at the resonant frequency, which is strongly affected by the tension force. The resonance frequency is monitored, by monitoring the motion of the device (proof mass and/or beams). A deviation between the measured resonant frequency and a resonant frequency corresponding the absence of force/acceleration can be used to calculate the force/acceleration. The resonant frequency can be tuned in a very large range by choosing an appropriate working point (the partially stretched configuration of the beam), and does not need to be applied to straight beams alone.

FIGS. 22a and 22b show the calculated dependence of the resonant frequency on the acceleration and on the deflection. One observes that the working point can be chosen where the sensitivity (the derivative of the frequency with respect to the deflection/acceleration) is maximal. It should be noted that the nonlinear dependence of the resonant frequency of the system on the axial force acting on the suspension and appearance of the maximum in FIG. 22b is possible only in the case of the curved initial configuration of the beam and does not take place in the case of an initially straight beam. FIG. 23 shows the examples of the resonant curves corresponding to different accelerations. In FIG. 23, frequency response is illustrated for a proof mass excited at resonance and subject to acceleration of 0 g (the continuous curve 600), 100 µg (the curve 602), and 10 µg (the curve 604). A DC voltage of 158.97306 V was applied to the parallel-plate electrode. In addition, AC voltage in sinusoidal form with amplitude of 5 µV was applied to the same parallel-plate electrode.

Note that two different techniques of the frequency monitoring can be used. In the framework of the first technique, the proof mass itself is excited at resonance and the resonant frequency monitored. The acceleration is extracted from the shift of the resonant frequency of the proof mass. In the framework of the second technique, the beam itself is excited at the resonant frequency of the beam which is higher than the proof mass frequency. The shift in the resonant frequency of the beam rather than of the proof mass is used for the acceleration extraction. A feature of the second technique is based on the fact that the resonant frequency of the beam is affected by the axial force acting on the beam. In the curved beam, the axial force is small until the beam is stretched (see FIG. 3, FIG. 14). As a result, it is possible to choose (by using a pre-loading by the electrode) a working point such that the sensitivity of the beam frequency to the beam's attachment point displacement (and therefore to the acceleration) is maximal. The excitation of the proof mass or of the beam is performed via an electrostatic actuator as described above.

Figure 24:
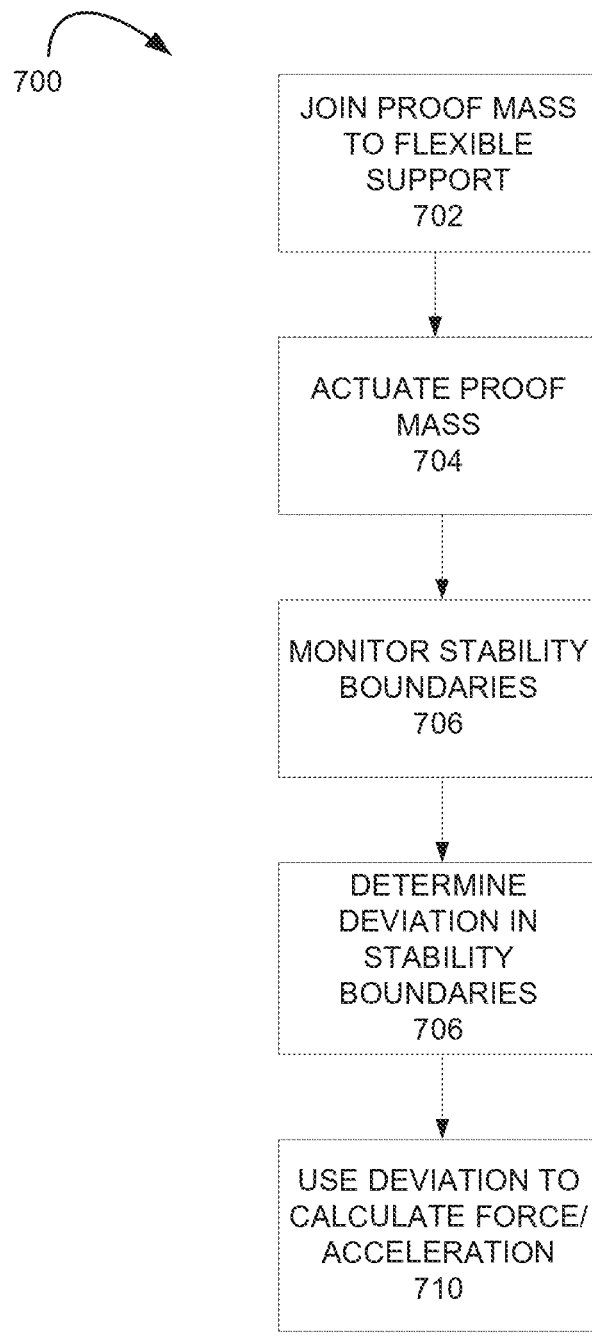
FIG. 24 is a flowchart illustrating a method for determining a force/acceleration by monitoring the stability boundary of a bistable device.

Referring now to FIG. 24, a flowchart 700 illustrates a method for determining a force/acceleration by monitoring a boundary of at least one of two stable regions of a bistable device.

At 702, a proof mass is anchored to a fixed base by an elastic suspension. As described above, the elastic suspension can include one or more flexible, initially-curved beams joined to the base on one end and to the proof mass on the other end. Optionally, two sets of beams are joined to the proof mass to anchor opposite sides of said proof mass to opposite sides of said base.

At 704, the proof mass is actuated by a time-dependent electrostatic force. The actuation may be performed by controlling the charging of a fixed electrode attached to the base and of an electrode joined to or embedded in the proof mass. The combination of the electrostatic force and the forces applied to the proof mass by the beam(s) is such that two stable regions are present where a motion of the proof mass is stable (bistability condition). The two stable regions generally encapsulate an intermediate unstable region. Optionally, the electrostatic force is applied to the proof mass by applying a voltage to the electrodes, where the time profile of the voltage is a saw-tooth profile or a triangle profile.

At 706, the location of a boundary of at least one stable region of the proof mass is monitored. The monitoring may be performed by sensing a snapping event, in which the proof mass snaps from its first stable region to its second stable region while passing through the intermediate unstable region. Therefore the snapping event occurs when the mass reaches the boundary between one of the stable regions and the intermediate unstable region. When the snapping event occurs, the actuation voltage corresponding to the snapping event (pull-in voltage) is recorded.

At 708, a deviation is determined (calculated) between the monitored location of the boundary and a reference location of the stability boundary corresponding to the case in which no force/acceleration is applied. Optionally, the deviation is determined by comparing the measured pull-in voltage to a reference pull-in voltage corresponding to the case in which no force/acceleration is present.

At 710, the deviation is used in order to calculate the force/acceleration, according to a predetermined algorithm.

Figure 25:
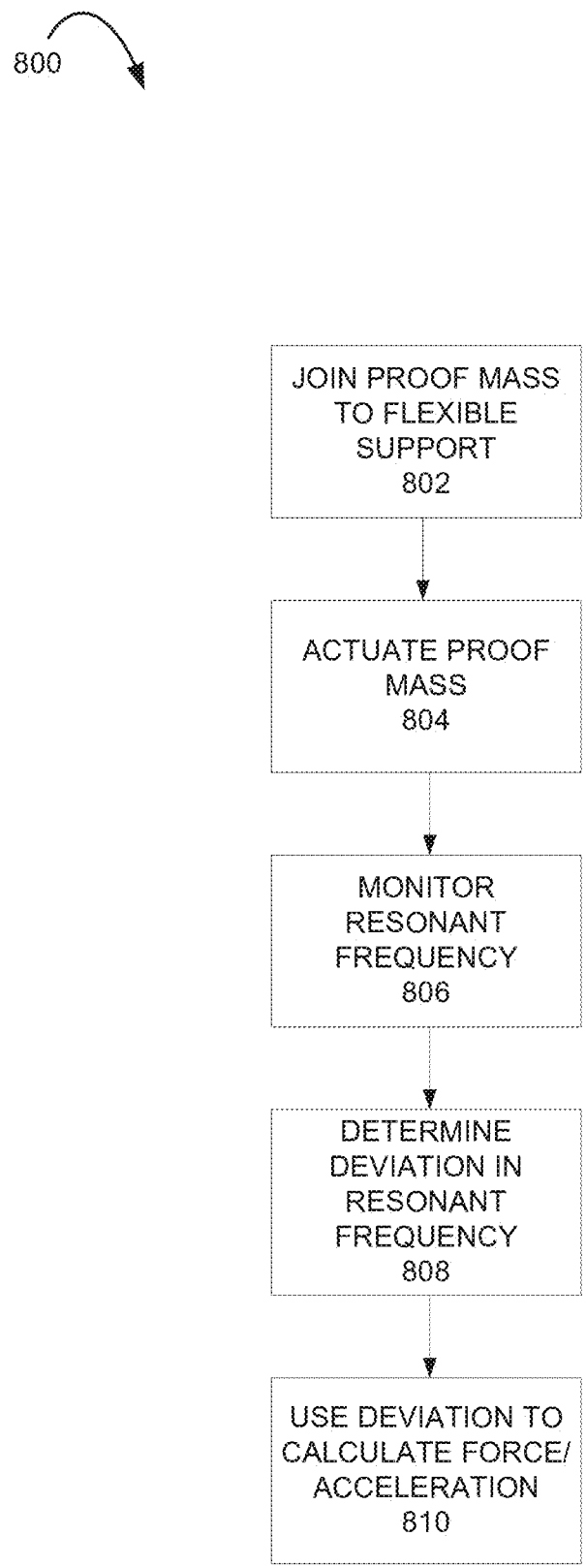
FIG. 25 is a flowchart illustrating a method for determining a force/acceleration by monitoring the resonant frequency of a bistable device.

Referring now to FIG. 25, a flowchart 800 illustrates a method for determining a force/acceleration by monitoring the resonant frequency of a bistable device.

At 802, a proof mass is anchored to a fixed base by an elastic suspension. As described above, the elastic suspension can include one or more flexible, initially-curved beams joined to the base on one end and to the proof mass on the other end. Optionally, two sets of beams are joined to the proof mass to anchor opposite sides of said proof mass to opposite sides of said base.

At 804, the proof mass is actuated by a time-dependent electrostatic force, in order to cause the proof mass to oscillate at its resonant frequency. The actuation may be performed by controlling the charging of a fixed electrode attached to the base and of an electrode joined to or embedded in the proof mass. The combination of the electrostatic force and the forces applied to the proof mass by the beam(s) is such that the proof mass has two stable regions, in which the proof mass' motion is stable (bistability condition). The stable regions typically encapsulate an intermediate unstable region, in which the proof mass moves in an unstable manner. Therefore the proof mass is actuated to oscillate within one of the two stable regions. Optionally, the electrostatic force is applied to the proof mass by applying a voltage to the electrodes, where the time profile of the voltage is a saw-tooth profile or a triangle profile. It should be noted that the mass (and beams) can be oscillated either at the mass' resonant frequency or at the beams' resonant frequency.

At 806, the resonant frequency of the device (proof mass or beams, as the case may be) is monitored, for example by monitoring the motion of the proof mass or beams.

At 808, a deviation is determined (calculated) between the monitored resonance frequency and reference resonance frequency corresponding to the case in which no force/acceleration is applied. At 810, the deviation is used in order to calculate the force/acceleration, according to predetermined formulas.

The invention claimed is:

1. A device for use in sensing a force and/or acceleration, comprising:
   a proof mass;
   an elastic suspension comprising at least one initially curved beam anchored to the base at one end and to the proof mass at another end, and shaped such that motion of the proof mass applies tension to the curved beam along a line connecting the ends of the curved beam, and enables changing a configuration of the curved beam from a curved shape to a straight shape, thereby providing a stiffening nonlinearity of the dependence of the tension force on displacement of the proof mass; and
   an electrostatic actuator comprising an electrode assembly, and configured for producing a variable electrostatic force by applying a variable voltage to the electrode assembly for actuating motion of said proof mass according to a selected time profile of the variable voltage, wherein a magnitude of the variable voltage is such that a combination of mechanical and electrostatic forces applied to said proof mass by said elastic suspension and by said electrostatic actuator creates a bistable behavior of the proof mass including a first stable region and a second stable region of displacement of the proof mass under the variable electrostatic force, where a motion of said proof mass is stable, and an intermediate unstable region located between said first and second stable regions, where the proof mass moves in an unstable manner by snapping between the first and second stable regions;

a sensing utility configured for (i) monitoring a snapping event of the proof mass in which said proof mass, while being actuated by said electrostatic actuator, snaps between said first stable region and said second stable region, and (ii) recording a value of an actuation voltage applied to the electrode assembly at which the snapping event occurs; and a processing utility configured and operable for (i) using data indicative of the snapping event for determining a deviation value being a deviation of the recorded actuation voltage corresponding to snapping in condition of acceleration from a reference actuation voltage corresponding to snapping in a condition of no acceleration and/or force, and (ii) using said deviation value for calculating the acceleration and/or force acting on the proof mass.

2. The device of claim 1, wherein said elastic suspension is configured for limiting a movement of said proof mass such that said proof mass does not come into contact with any other element of the sensor.

3. The device of claim 1, further comprising at least one folded suspension arranged transversely to the curved beams of the elastic suspension, and anchoring the proof mass to the base, the folded suspension being configured for limiting movement of said proof mass to a selected axis, wherein said electrostatic actuator is configured to actuate said proof mass only along said selected axis.

4. The device of claim 1, wherein said elastic suspension comprises at least two initially curved beams, anchoring opposite sides of said proof mass to opposite sides of said base, such that, upon motion of said proof mass from an initial position thereof, one of said at least two beams is straightened and another beam is compressed.

5. The device of claim 1, wherein said electrode assembly of the electrostatic actuator comprises:

a first set of parallel electrodes joined to said proof mass and a second set of electrodes parallel to said electrodes of said first set, said second set of electrodes being joined to said base, such that application of potential difference between said first and second sets of electrodes produces said electrostatic force therebetween.

6. The device of claim 4, wherein said electrostatic actuator comprises:

a comb drive actuator comprising a third set of parallel electrodes joined to said proof mass and a fourth set of electrodes parallel to said electrodes of said third set, said third set of electrodes being joined to said base, such that application of potential difference between said third and fourth sets of electrodes produces an electrostatic force therebetween.

7. The device of claim 5, further comprising a thermal actuator, wherein said second electrode set is joined to said thermal actuator, said thermal actuator being controllable for varying a position of said second electrode set joined to said base, in order to change a distance between said first electrode set joined to said proof mass and said second electrode set joined to said base, thereby tuning the distance between the electrode sets such that the device manifests bistable behavior.

8. The device of claim 5, wherein said electrostatic actuator further comprises a second parallel plate actuator located on a side of said proof mass opposite to said first parallel set actuator for tuning a location of a boundary of at least one of said first and second stability regions, via an application of a desired constant DC voltage to said first parallel plate actuator, and an application of linearly increasing voltage to said second parallel plate actuator.

9. A device for use in sensing a force and/or acceleration, comprising:

a proof mass;

an elastic suspension comprising at least one initially curved beam anchored to the base at one end and to the proof mass at another end, and shaped such that motion of the proof mass applies tension to the curved beam along a line connecting the ends of the curved beam, and enables changing a configuration of the curved beam from a curved shape to a straight shape, thereby providing a stiffening nonlinearity of the dependence of the tension force on displacement of the proof mass; and an electrostatic actuator comprising an electrode assembly, and configured for producing a variable electrostatic force by applying a variable voltage to the electrode assembly for actuating motion of said proof mass according to a selected time profile of the variable voltage, wherein a magnitude of the variable voltage is such that a combination of mechanical and electrostatic forces applied to said proof mass by said elastic suspension and by said electrostatic actuator creates a bistable behavior of the proof mass including a first stable region and a second stable region of displacement of the proof mass under the variable electrostatic force, where a motion of the proof mass is stable, and an intermediate unstable region located between said first and second stable regions, where the proof mass moves in an unstable manner by snapping between the first and second stable regions, the profile of the variable voltage includes a component causing the device to oscillate within one of the two stable regions, and excite the device at a resonant frequency thereof, thereby a deviation between the device's resonant frequency and a reference resonant frequency corresponding to a condition of absence of force/acceleration is indicative of the force and/or acceleration acting on the device.

10. The device of claim 9, wherein the device's resonant frequency is the proof mass' resonant frequency.

11. The device of claim 9, wherein the device's resonant frequency is said beams' resonant frequency.

12. A method for determining an acceleration and/or a force applied on a proof mass, the method comprising:

attaching the proof mass to a base via an elastic suspension comprising at least one initially curved beam anchored to the base at one end and to the proof mass at another end, and shaped such that motion of the proof mass applies tension to the curved beam along a line connecting the ends of the curved beam, and enables changing a configuration of the curved beam from a curved shape to a straight shape, thereby providing a stiffening nonlinearity of the dependence of the tension force on displacement of the proof mass;

actuating the proof mass via an electrostatic actuator comprising an electrode assembly by applying a variable voltage across said electrode assembly according to a selected time profile, such that a combination of mechanical and electrostatic forces applied to said proof mass by said elastic suspension and by said electrostatic actuator creates a bistable behavior of the proof mass including a first stable region and a second stable region of displacement of the proof mass under the variable electrostatic force, where a motion of said proof mass' is stable, and an intermediate unstable region located between said first and second stable regions, where the proof mass moves in an unstable manner by snapping between the first and second stable regions;

monitoring a snapping event of the proof mass in which said proof mass, while being actuated by said electrostatic actuator, snaps between said first stable region and said second stable region, and recording a value of an actuation voltage applied to the electrode assembly at which the snapping event occurs;

using data indicative of the snapping event for determining a deviation value being a deviation of the recorded actuation voltage corresponding to snapping in condition of acceleration from a reference actuation voltage corresponding to snapping in a condition of no force and/or acceleration; and using said deviation value for calculating the force acting on said proof mass and/or acceleration of the proof mass.

13. The method of claim 12, wherein:
said determining of said deviation comprises determining a relation between said recorded actuation voltage and an actuation voltage indicative of snapping in a condition of no force and/or acceleration.

14. The method of claim 12, wherein said elastic suspension comprises at least a first and a second initially curved beams, anchoring opposite sides of the proof mass to opposite sides of said base, such that, upon motion of the proof mass from an initial position thereof, said first beam is straightened and said second beam is compressed.

15. The method of claim 12, wherein a movement of said proof mass is limited by said elastic suspension in that said proof mass does not come into contact with any element except for said elastic suspension.

16. A method for calculating an acceleration and/or force acting on a proof mass, the method comprising:
attaching the proof mass to a base via an elastic suspension comprising at least one initially curved beam anchored to the base at one end and to the proof mass at another end, and adapted such that motion of the proof mass applies tension to the curved beam along a line connecting the ends of the curved beam, and enables changing a configuration of the curved beam from a curved shape to a straight shape, thereby providing a stiffening nonlinearity of the dependence of the tension force on displacement of the proof mass;

actuating the proof mass via an electrostatic actuator comprising an electrode assembly by applying a variable voltage across said electrode assembly according to a selected time profile, such that a combination of mechanical and electrostatic forces applied to said proof mass by said elastic suspension and by said electrostatic actuator creates a bistability of the device in which a first stable region and a second stable region are present, where a motion of said proof mass is stable, and an intermediate unstable region located between said first and second stable regions, where the proof mass moves in an unstable manner by snapping between the first and second stable regions, wherein the variable voltage for the actuating includes a component to drive an oscillation of the proof mass within one of said stable regions, such that a resonance frequency of said proof mass or of said beam suspension is achieved;

monitoring said resonance frequency;

determining a deviation of said monitored resonance frequency with respect to a reference resonance frequency indicative of a condition of no acceleration and/or no force; and using said deviation to determine the acceleration and/or force acting on said proof mass.

17. The method of claim 16, wherein said actuating results in the achievement of said resonance frequency of the initially curved beam, said initially curved beam being excited in the lateral direction by being pulled predominantly along said beam's axis by said proof mass and by the acceleration and/or force.

* * * * *